(12) United States Patent
Kies et al.

(10) Patent No.: US 10,945,141 B2
(45) Date of Patent: Mar. 9, 2021

(54) SYSTEMS AND METHODS FOR IMPROVING CONTENT PRESENTATION

(71) Applicant: QUALCOMM Incorporated, San Diego, CA (US)

(72) Inventors: Jonathan Kies, Encinitas, CA (US); Walker Curtis, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 661 days.

(21) Appl. No.: 15/658,612

(22) Filed: Jul. 25, 2017

(65) Prior Publication Data

US 2019/0037422 A1   Jan. 31, 2019

(51) Int. Cl.
*H04W 24/04* (2009.01)
*H04W 24/08* (2009.01)
(Continued)

(52) U.S. Cl.
CPC .......... *H04W 24/04* (2013.01); *H04L 41/147* (2013.01); *H04L 43/08* (2013.01);
(Continued)

(58) Field of Classification Search
CPC ..... H04W 24/02; H04W 24/04; H04W 24/08; H04W 88/08; H04W 28/16; H04N 21/25841; H04N 21/2402; H04N 21/41407; H04N 21/2385; H04N 21/43637; H04N 21/2353; H04N 21/8146; H04N 21/816; H04N 21/24; H04N 21/266; H04L 41/147; H04L 43/08; H04L 67/30; H04L 12/5692;
(Continued)

(56) References Cited

U.S. PATENT DOCUMENTS

| 6,449,484 | B1 * | 9/2002 | Grubeck | H04W 52/50 370/329 |
| 6,748,233 | B1 * | 6/2004 | Arnold | H04W 52/282 455/522 |

(Continued)

FOREIGN PATENT DOCUMENTS

| EP | 2843956 A1 | 3/2015 |
| WO | WO-2016205800 A1 | 12/2016 |
| WO | WO-2019023248 A1 * | 1/2019 ............ H04W 24/04 |

OTHER PUBLICATIONS

Abari O., et al., "Cutting the Cord in Virtual Reality", 15, ACM Workshop on Hot Topics in Networks, Nov. 2016, pp. 162-168.
(Continued)

*Primary Examiner* — Kostas J Katsikis
(74) *Attorney, Agent, or Firm* — Pamela K. Soggu

(57) ABSTRACT

Systems, methods, and devices of various embodiments may improve content presentation. The systems, methods, and devices may predict a state of a presentation environment to be induced by one or more stimuli in content to be presented to one or more users in the presentation environment. The systems, methods, and devices may predict, based on the predicted state of the presentation environment, a state of at least one communication link of one or more communication links. The systems, methods, and devices may perform an action in response to the predicted state of the at least one communication link meeting one or more criteria. The action may help improve content presentation.

31 Claims, 12 Drawing Sheets

(51) Int. Cl.
  *H04L 12/26* (2006.01)
  *H04W 24/02* (2009.01)
  *H04L 12/24* (2006.01)
  *H04N 21/235* (2011.01)
  *H04N 21/4363* (2011.01)
  *H04N 21/2385* (2011.01)
  *H04N 21/414* (2011.01)
  *H04N 21/24* (2011.01)
  *H04N 21/258* (2011.01)
  *H04B 7/26* (2006.01)
  *H04B 7/06* (2006.01)
  *H04N 21/81* (2011.01)
  *H04W 88/08* (2009.01)
  *H04L 29/08* (2006.01)

(52) U.S. Cl.
  CPC ..... *H04N 21/2353* (2013.01); *H04N 21/2385* (2013.01); *H04N 21/2402* (2013.01); *H04N 21/25841* (2013.01); *H04N 21/41407* (2013.01); *H04N 21/43637* (2013.01); *H04W 24/02* (2013.01); *H04W 24/08* (2013.01); *H04B 7/0695* (2013.01); *H04B 7/26* (2013.01); *H04L 67/30* (2013.01); *H04N 21/816* (2013.01); *H04N 21/8146* (2013.01); *H04W 88/08* (2013.01)

(58) Field of Classification Search
  CPC . H04L 41/0896; H04L 43/00; H04L 43/0876; H04B 7/26; H04B 7/0695; H04B 10/114; H04J 3/1682; H04H 20/57; G06F 1/1626; G06F 16/9537
  See application file for complete search history.

(56) References Cited

U.S. PATENT DOCUMENTS

| | | | | |
|---|---|---|---|---|
| 7,610,560 | B2* | 10/2009 | Horvitz | G01C 21/36 715/764 |
| 8,831,524 | B2* | 9/2014 | Milner | H04W 24/02 370/256 |
| 9,031,809 | B1* | 5/2015 | Kumar | G01C 21/165 702/150 |
| 9,119,179 | B1* | 8/2015 | Firoiu | H04W 76/10 |
| 9,134,873 | B2* | 9/2015 | Kies | G06F 3/048 |
| 9,417,754 | B2* | 8/2016 | Smith | G06F 1/1647 |
| 9,461,955 | B1* | 10/2016 | Sherrets | H04L 51/32 |
| 9,578,495 | B2 | 2/2017 | Xiang et al. | |
| 9,928,655 | B1* | 3/2018 | Alston | G06T 19/006 |
| 10,130,261 | B2* | 11/2018 | Tzvieli | G06K 9/00234 |
| 10,412,412 | B1* | 9/2019 | Waggoner | H04N 19/109 |
| 10,462,041 | B2* | 10/2019 | Surender | H04L 43/10 |
| 10,484,308 | B2* | 11/2019 | Liu | H04L 65/4092 |
| 2003/0137930 | A1* | 7/2003 | Futernik | H04B 7/1856 370/216 |
| 2004/0085909 | A1* | 5/2004 | Soliman | H04W 24/02 370/252 |
| 2006/0019679 | A1* | 1/2006 | Rappaport | G01S 5/0252 455/456.5 |
| 2006/0055598 | A1* | 3/2006 | Garin | G01S 19/05 342/357.64 |
| 2006/0285500 | A1* | 12/2006 | Booth, III | H04L 43/0829 370/250 |
| 2007/0208619 | A1* | 9/2007 | Branam | G06Q 30/00 705/14.45 |
| 2008/0101241 | A1* | 5/2008 | Mohan | H04L 12/4641 370/236.2 |
| 2008/0191936 | A1* | 8/2008 | Phatak | G01S 19/05 342/357.42 |
| 2008/0248822 | A1* | 10/2008 | Jarvinen | H04L 1/0001 455/509 |
| 2008/0273591 | A1 | 11/2008 | Brooks et al. | |
| 2009/0081956 | A1* | 3/2009 | Liechty | H04W 24/00 455/67.7 |
| 2009/0193485 | A1 | 7/2009 | Rieger et al. | |
| 2009/0238370 | A1* | 9/2009 | Rumsey | H04R 29/00 381/58 |
| 2009/0238371 | A1* | 9/2009 | Rumsey | H04R 29/001 381/58 |
| 2010/0290346 | A1* | 11/2010 | Barford | H04L 41/064 370/242 |
| 2010/0323715 | A1* | 12/2010 | Winters | G01S 5/0027 455/456.1 |
| 2011/0066262 | A1* | 3/2011 | Kelly | G05B 23/0267 700/90 |
| 2011/0199304 | A1* | 8/2011 | Walley | G06F 3/017 345/158 |
| 2011/0287778 | A1* | 11/2011 | Levin | G01S 5/0252 455/456.1 |
| 2012/0075264 | A1* | 3/2012 | Kies | G06Q 30/02 345/204 |
| 2012/0077437 | A1* | 3/2012 | Agevik | G01C 21/20 455/41.2 |
| 2012/0307884 | A1* | 12/2012 | MacInnis | H04W 72/1242 375/240.02 |
| 2013/0010612 | A1* | 1/2013 | Lee | H04B 10/27 370/248 |
| 2013/0017796 | A1* | 1/2013 | Milner | H04W 24/02 455/67.13 |
| 2013/0053054 | A1* | 2/2013 | Lovitt | H04W 4/029 455/456.1 |
| 2014/0036999 | A1* | 2/2014 | Ryu | H04N 19/50 375/240.12 |
| 2014/0189141 | A1* | 7/2014 | Kim | H04L 65/602 709/231 |
| 2014/0258505 | A1* | 9/2014 | Liao | H04W 4/029 709/224 |
| 2015/0029868 | A1* | 1/2015 | Mahasenan | H04L 41/12 370/242 |
| 2015/0109338 | A1* | 4/2015 | McKinnon | G06F 16/5866 345/633 |
| 2015/0149592 | A1 | 5/2015 | Gibbon et al. | |
| 2015/0319729 | A1* | 11/2015 | MacGougan | H04W 4/023 455/456.1 |
| 2015/0326901 | A1* | 11/2015 | Tiraspolsky | H04N 21/472 725/31 |
| 2015/0373565 | A1 | 12/2015 | Safavi | |
| 2016/0004751 | A1* | 1/2016 | Lafuente Alvarez | G06N 5/04 707/718 |
| 2016/0025850 | A1* | 1/2016 | Rigsby | G01S 13/72 342/61 |
| 2016/0077547 | A1* | 3/2016 | Aimone | G06F 3/012 345/8 |
| 2016/0150212 | A1 | 5/2016 | Moura et al. | |
| 2016/0164788 | A1* | 6/2016 | Goel | H04L 43/0876 709/228 |
| 2016/0198140 | A1 | 7/2016 | Nadler | |
| 2016/0217760 | A1* | 7/2016 | Chu | G06T 1/20 |
| 2016/0219267 | A1* | 7/2016 | Chu | H04L 65/605 |
| 2016/0219325 | A1* | 7/2016 | Chu | H04N 21/42653 |
| 2016/0248704 | A1* | 8/2016 | Soelberg | H04L 49/9005 |
| 2016/0280401 | A1* | 9/2016 | Driscoll | B64G 3/00 |
| 2016/0330643 | A1* | 11/2016 | Sahin | H04B 7/088 |
| 2016/0380820 | A1* | 12/2016 | Horvitz | G06N 5/04 370/254 |
| 2017/0064531 | A1* | 3/2017 | Stephenne | G06T 7/20 |
| 2017/0094450 | A1* | 3/2017 | Tu | H04W 4/029 |
| 2017/0160518 | A1* | 6/2017 | Lanman | G06F 3/011 |
| 2017/0160798 | A1* | 6/2017 | Lanman | G06T 5/002 |
| 2017/0161951 | A1* | 6/2017 | Fix | G06T 5/00 |
| 2017/0180769 | A1* | 6/2017 | Yerli | H04N 21/242 |
| 2017/0222916 | A1* | 8/2017 | Surender | H04L 41/0663 |
| 2017/0295000 | A1* | 10/2017 | Yoo | H04B 17/336 |
| 2017/0352185 | A1* | 12/2017 | Bonilla Acevedo | G02B 27/0179 |
| 2017/0358136 | A1* | 12/2017 | Gollier | G02B 27/0172 |
| 2018/0088669 | A1* | 3/2018 | Ramaprakash | G06F 1/163 |
| 2018/0092542 | A1* | 4/2018 | Tzvieli | A61B 5/0075 |
| 2018/0096244 | A1* | 4/2018 | Mallinson | H04N 13/366 |

(56) References Cited

U.S. PATENT DOCUMENTS

| | | | |
|---|---|---|---|
| 2018/0096517 A1* | 4/2018 | Mallinson | G06T 15/20 |
| 2018/0101985 A1* | 4/2018 | Jones-McFadden | G06T 19/006 |
| 2018/0139622 A1* | 5/2018 | Cornforth | H04W 24/00 |
| 2018/0270531 A1* | 9/2018 | Ye | H04N 21/44218 |
| 2018/0284802 A1* | 10/2018 | Tsai | G05D 1/0246 |
| 2018/0286099 A1* | 10/2018 | Kozloski | G06T 1/60 |
| 2018/0345128 A1* | 12/2018 | Ahmed | A63F 13/22 |
| 2018/0359489 A1* | 12/2018 | Lakshman | H04N 19/597 |
| 2019/0037422 A1* | 1/2019 | Kies | H04W 24/08 |
| 2019/0174337 A1* | 6/2019 | Prasad | H04B 7/0639 |
| 2020/0084139 A1* | 3/2020 | Surender | H04L 69/22 |

OTHER PUBLICATIONS

Kim J., et al., "Strategic Control of 60 GHz Millimeter-Wave High-Speed Wireless Links for Distributed Virtual Reality Platforms", Hindawi Mobile Information Systems, vol. 2017, Article ID 5040347, 2017, pp. 1-10.

Sibeam: "60 GHz: Taking the VR Experience to the Next Level", A Lattice semiconductor Technology, Retrieved from internet on Apr. 7, 2017, http://www.sibeam.com/Blogs/2016/March/60GHZTakingtheVRExperience.aspx, pp. 1-2.

Venugopal K., et al., "Millimeter Wave Networked Wearables in Dense Indoor Environments", IEEE Access, Special Section on Body Area Networks for Interdisciplinary Research, vol. 4, 2016, pp. 1205-1221.

International Search Report and Written Opinion—PCT/US2018/043514—ISA/EPO—dated Sep. 25, 2018.

\* cited by examiner

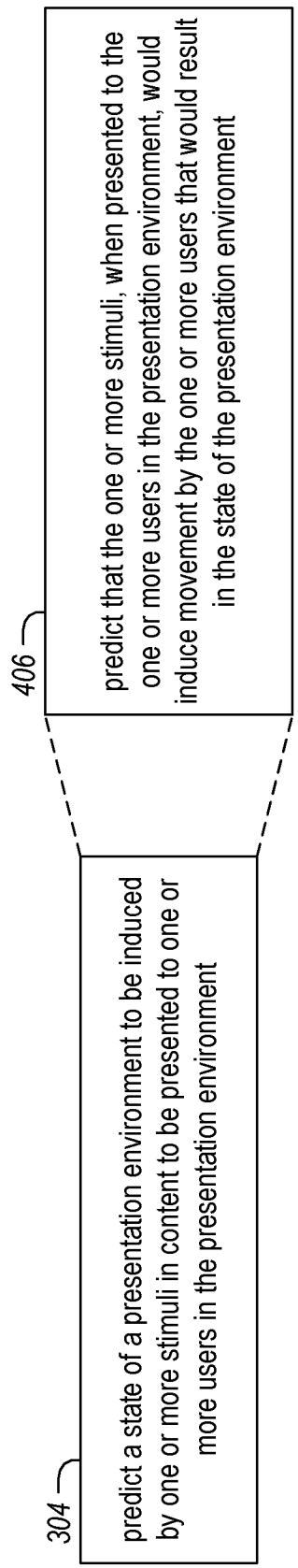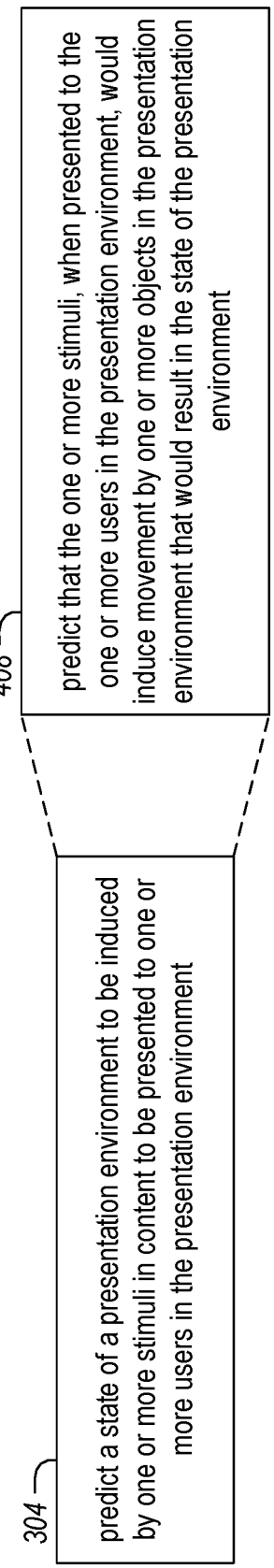
Figure 4B
Figure 4C

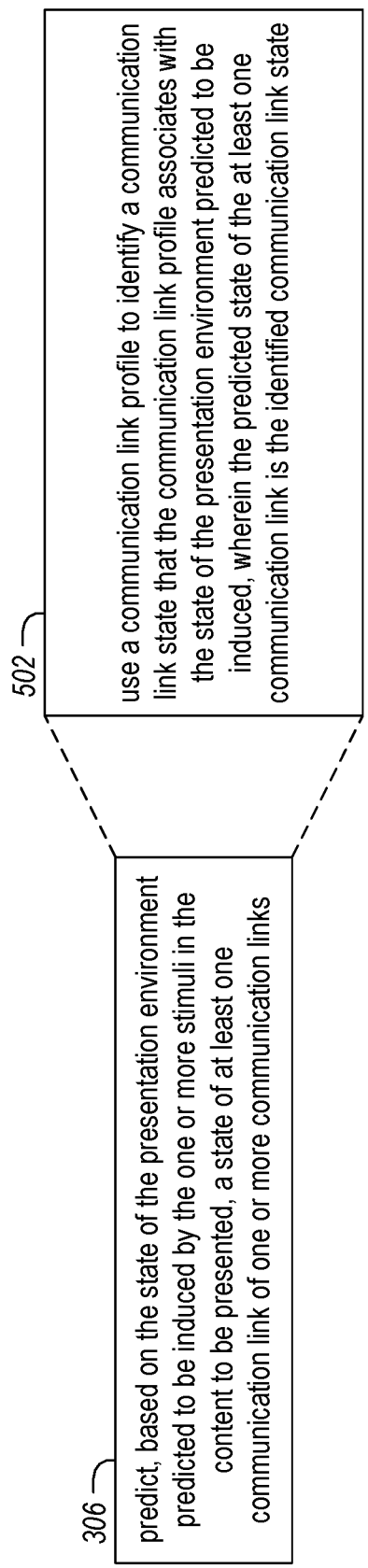

*Figure 5*

306 — predict, based on the state of the presentation environment predicted to be induced by the one or more stimuli in the content to be presented, a state of at least one communication link of one or more communication links 502 — use a communication link profile to identify a communication link state that the communication link profile associates with the state of the presentation environment predicted to be induced, wherein the predicted state of the at least one communication link is the identified communication link state

SYSTEMS AND METHODS FOR IMPROVING CONTENT PRESENTATION

BACKGROUND

Field

The present invention generally relates to presenting content and, in particular, to improving content presentation.

Background Technology

Some technologies require a large amount of data to be transmitted with very low latency. For example, virtual reality (VR) streaming typically includes streaming 360-degree visual content and/or other multimedia content to a head-mounted display (HMD). To provide high data throughput and low latency for virtual reality, some virtual reality systems use a High-Definition Multimedia Interface (HDMI) cable physically connected to a user's head-mounted display. Unfortunately, while users are immersed in the virtual reality presented by such cable-based systems, there is a risk that the cable may contact the users, disrupting the users' immersive experience, or may trip the users, causing the users to fall and hurt themselves.

Millimeter wave (mmW) wireless communication—which uses a wireless signal that has a wavelength ($\lambda$) is 1 to 10 mm in a range of frequency spectrum from 30 to 300 GHz—may advantageously provide high data throughput with low latency, making it a potential solution for virtual reality streaming and/or other technologies. Advantageously, by using a millimeter wave wireless signal, a virtual reality system does not require an obstructive HDMI cable, or the like, connected to a user's head-mounted display.

Unfortunately, when line of sight between a millimeter wave transmitter and a millimeter wave receiver is obstructed, the millimeter wave wireless signal's performance degrades. This performance degradation may cause the virtual reality content presented by a user's head-mounted display to pause and/or skip ahead, disrupting the user's immersion in the virtual reality and potentially ruining the overall user experience.

SUMMARY

A need therefore exists for systems and methods that eliminate or reduce the disadvantages and problems listed above and/or other disadvantages and problems.

One aspect is a method for improving content presentation. The method may comprise, by a processor, predicting a state of a presentation environment to be induced by one or more stimuli in content to be presented to one or more users in the presentation environment. The method may also comprise predicting, based on the state of the presentation environment predicted to be induced by the one or more stimuli in the content to be presented, a state of at least one communication link of one or more communication links. The method may also comprise performing an action in response to the state of the at least one communication link, which was predicted based on the state of the presentation environment predicted to be induced by the one or more stimuli in the content, meeting one or more criteria.

Another aspect is a system for improving content presentation. The system may comprise a processor configured with processor-executable instructions to perform operations that may comprise predicting a state of a presentation environment to be induced by one or more stimuli in content to be presented to one or more users in the presentation environment. The operations may also comprise predicting, based on the state of the presentation environment predicted to be induced by the one or more stimuli in the content to be presented, a state of at least one communication link of one or more communication links. The operations may also comprise performing an action in response to the state of the at least one communication link, which was predicted based on the state of the presentation environment predicted to be induced by the one or more stimuli in the content, meeting one or more criteria.

Yet another aspect is an apparatus for improving content presentation. The apparatus may comprise means for predicting a state of a presentation environment to be induced by one or more stimuli in content to be presented to one or more users in the presentation environment. The apparatus may comprise means for predicting, based on the state of the presentation environment predicted to be induced by the one or more stimuli in the content to be presented, a state of at least one communication link of one or more communication links. The apparatus may comprise means for performing an action in response to the state of the at least one communication link, which was predicted based on the state of the presentation environment predicted to be induced by the one or more stimuli in the content, meeting one or more criteria.

Still another aspect is a non-transitory processor-readable storage medium having stored thereon processor-executable instructions configured to cause a processor of a server to perform operations that may comprise predicting a state of a presentation environment to be induced by one or more stimuli in content to be presented to one or more users in the presentation environment. The operations may also comprise predicting, based on the state of the presentation environment predicted to be induced by the one or more stimuli in the content to be presented, a state of at least one communication link of one or more communication links. The operations may also comprise performing an action in response to the state of the at least one communication link, which was predicted based on the state of the presentation environment predicted to be induced by the one or more stimuli in the content, meeting one or more criteria.

For purposes of summarizing, some aspects, advantages and features of a few of the embodiments of the invention have been described in this summary. Some embodiments of the invention may include some or all of these summarized aspects, advantages and features. However, not necessarily all of (or any of) these summarized aspects, advantages or features will be embodied in any particular embodiment of the invention. Thus, none of these summarized aspects, advantages and features are essential. Some of these summarized aspects, advantages and features and other aspects, advantages and features may become more fully apparent from the following detailed description and the appended claims.

BRIEF DESCRIPTION OF THE DRAWINGS

The appended drawings contain figures of preferred embodiments to further clarify the above and other aspects, advantages and features. It will be appreciated that these drawings depict only preferred embodiments of the invention and are not intended to limit its scope. These preferred embodiments will be described and explained with additional specificity and detail through the use of the accompanying drawings in which:

FIG. 4B is a flowchart illustrating an embodiment method for improving content presentation;

FIG. 4C is a flowchart illustrating an embodiment method for improving content presentation;

FIG. 5 is a flowchart illustrating an embodiment method for improving content presentation;

DETAILED DESCRIPTION

The present disclosure is generally directed towards a virtual reality system. The principles of the present disclosure, however, are not limited to virtual reality systems. It will be understood that, in light of the present disclosure, the embodiments disclosed herein can be successfully used in connection with other types of content presentation systems, such as, augmented reality systems. A detailed description of the virtual reality system now follows.

Figure 1A:
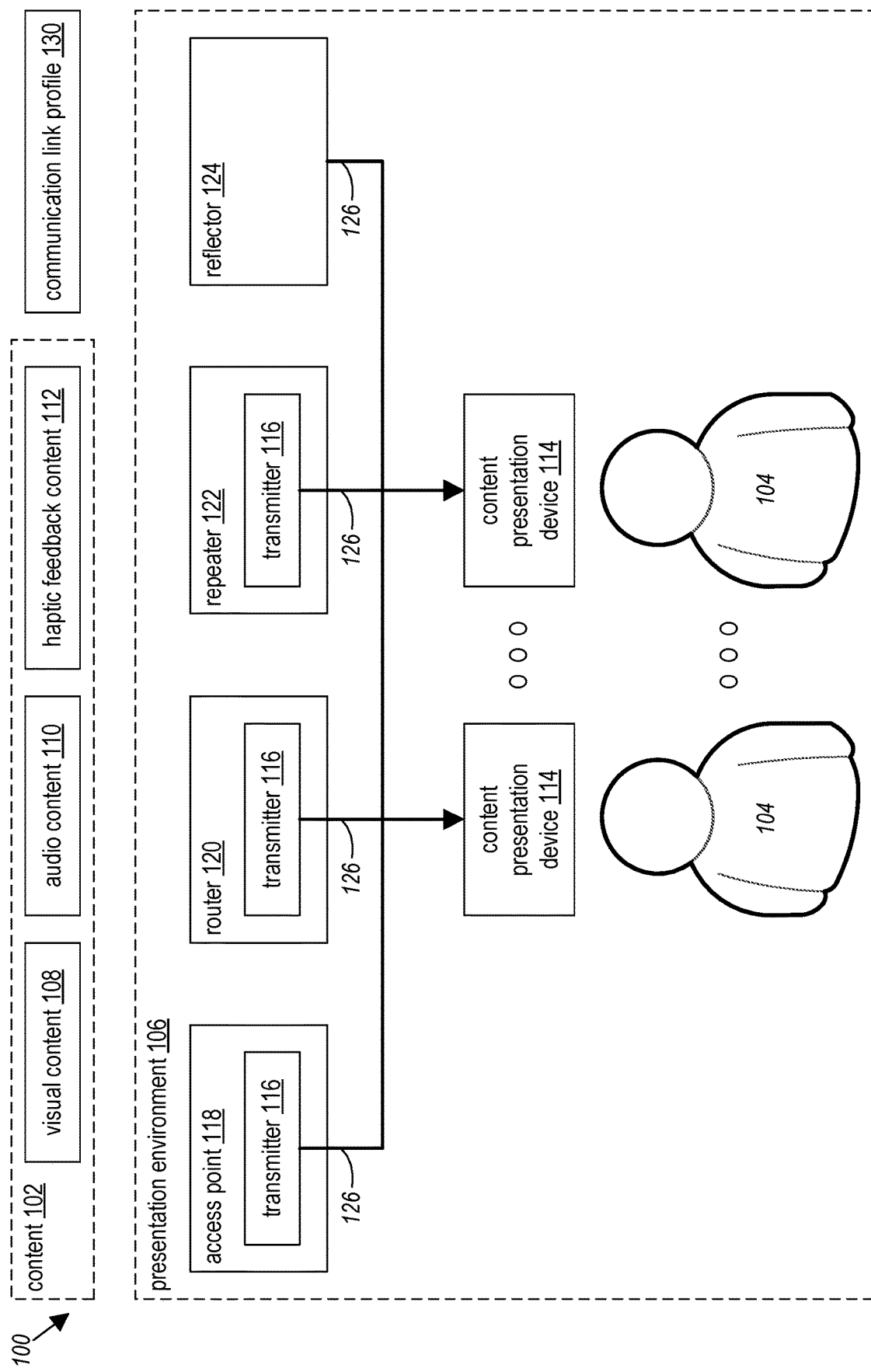
FIG. 1A is a diagram of an embodiment of a content presentation system.

FIG. 1A is a diagram of an embodiment of a content presentation system, such as, a virtual reality system 100. The virtual reality system 100 may be configured to present content 102 to one or more users 104 in a presentation environment 106. The content 102 may include visual content 108, audio content 110, haptic feedback content 112, other content, or any combination thereof. The visual content 108 may include, for example, video, rendered graphics, other visual content, or any combination thereof.

The presentation environment 106 may include one or more users 104, one or more content presentation devices 114, one or more transmitters 116, one or more access points 118, one or more routers 120, one or more repeaters 122, one or more reflectors 124, one or more other objects (e.g., a user's furniture, obstacles in a virtual reality facility, and/or other objects), or any combination thereof.

Figure 2A:
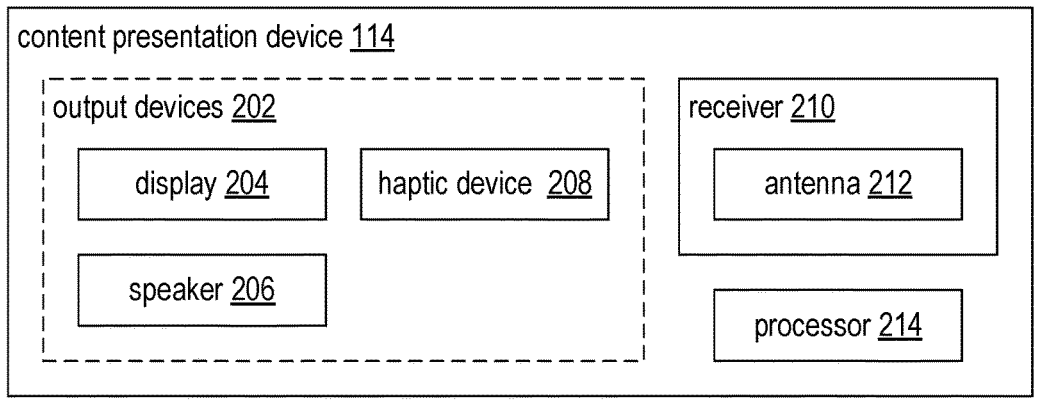
FIG. 2A is a diagram of an embodiment of a content presentation device.

FIG. 2A is a diagram of an embodiment of a content presentation device, such as, a content presentation device 114. The content presentation device 114 may be configured to present the content 102 to a user 104.

As shown in FIG. 2A, the content presentation device 114 may include one or more output devices 202, which may include one or displays 204 configured to present the visual content 108, one or more speakers 206 configured to present the audio content 110, one or more haptic devices 208 configured to present the haptic feedback content 112, one or more other devices configured to present other content, or any combination thereof. Speakers 206 may include, or form part of, one or more earpieces.

The content presentation device 114 may include one or more receivers 210 configured to receive the content 102 through one or more communication links 126 in FIG. 1A. Receiver 210 may, for example, include one or more antennas 212 that may receive content 102 through a wireless communication link, such as a millimeter wave wireless communication link or other type of wireless communication link. It will be appreciated that the communication links 126 may comprise one or more wireless communication links, one or more wired communication links, or both, depending upon the configuration of the virtual reality system 100. The content presentation device 114 may also include one or more processors 214.

Figure 2B:
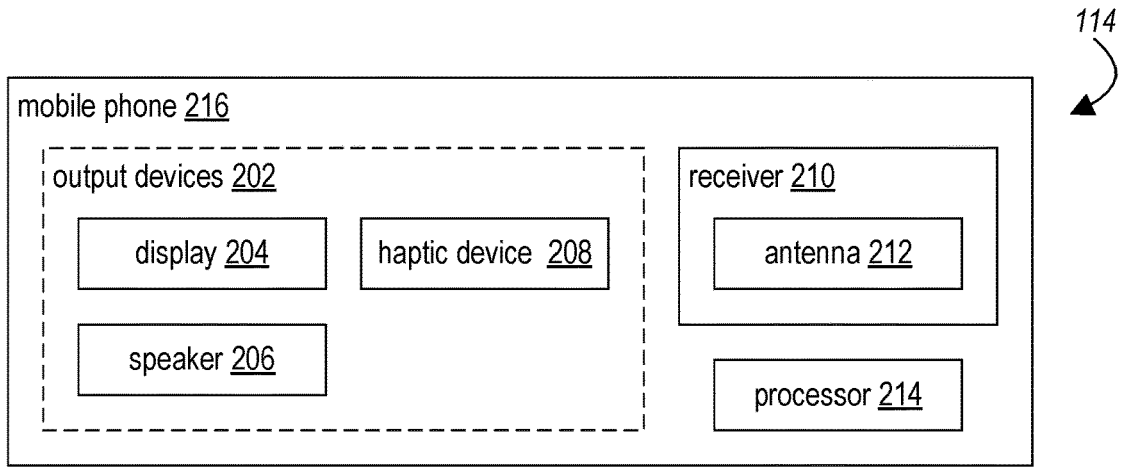
FIG. 2B is a diagram of an embodiment of a content presentation device.

FIG. 2B is a diagram of an embodiment of a content presentation device. As shown in FIG. 2B, the content presentation device 114 may comprise a mobile phone 216, which may include one or more displays 204, one or more speakers 206, one or more haptic devices 208, one or more receivers 210, one or more processors 214, other devices, or any combination thereof.

Figure 2C:
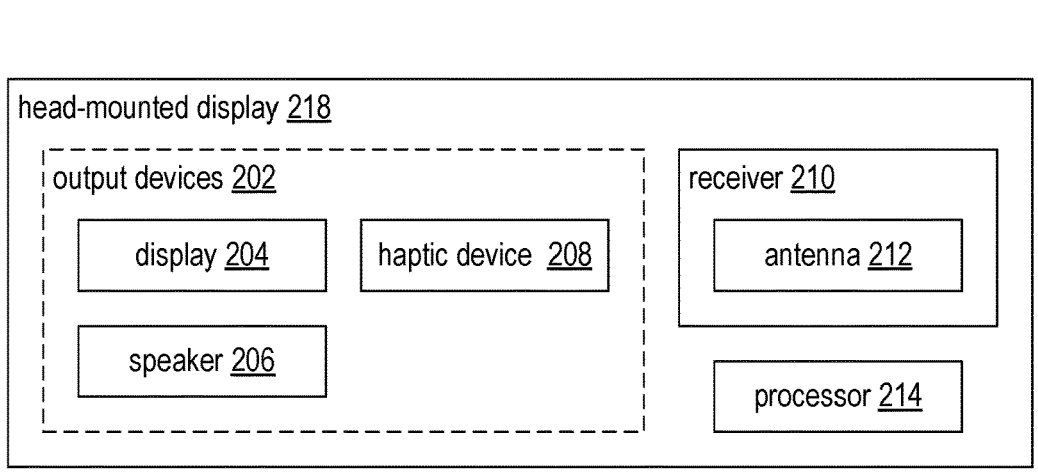
FIG. 2C is a diagram of an embodiment of a content presentation device.

FIG. 2C is a diagram of an embodiment of a content presentation device. As shown in FIG. 2C, the content presentation device 114 may comprise a head-mounted display 218, which may include one or more displays 204, one or more speakers 206, one or more haptic devices 208, one or more receivers 210, one or more processors 214, other devices, or any combination thereof.

In some embodiments, the head-mounted display 218 may comprise a mobile phone that may be selectively connected to and disconnected from the other components of the head-mounted display. For example, the head-mounted display 218 may include a receptacle or other type of receiving portion sized and configured to receive the mobile phone, which may allow the mobile phone to be mounted to the other components of the head-mounted display. With the mobile phone mounted to the other components of the head-mounted display 218, the mobile phone, the other components of the head-mounted display, or both may provide one or more display devices 204, one or more speakers 206, one or more haptic devices 208, or any combination thereof. The head-mounted display 218, however, need not include a mobile phone and may comprise components that are configured to remain interconnected. In some embodiments, the head-mounted display 218 may comprise eyewear, a near-eye display, or any other suitable head-mounted display. For example, the head-mounted display 218 may comprise eyewear with see-through lenses that may be used to provide an augmented reality experience with which the user 104 can see both portions of the content 102 and portions of the user's physical environment.

As shown in FIG. 1A, a transmitter 116 may be configured to provide content 102 to a content presentation device 114 through a communication link 126. In particular, the receiver 210 of the content presentation device 114 may receive the content 102 provided via the communication link 126, and the content presentation device may present the received content to a user 104. For example, in some embodiments, a communication link 126 may be a wireless communication link (such as a millimeter wave wireless communication link or other wireless communication link), and the transmitter 116 may provide (and the content presentation device 114 may receive) the content 102 via the wireless communication link.

A transmitter 116 may be embodied in any of a variety of suitable components, as shown in FIG. 1A. For example, an access point 118 may comprise a transmitter 116, a router 120 may comprise a transmitter 116, and a repeater 122 may comprise a transmitter 116. A repeater 122 may, for example, receive a wireless signal providing a communication link 126 (e.g., from an access point 118 or from a router 120), and the repeater may retransmit the received wireless signal.

Figure 1C:
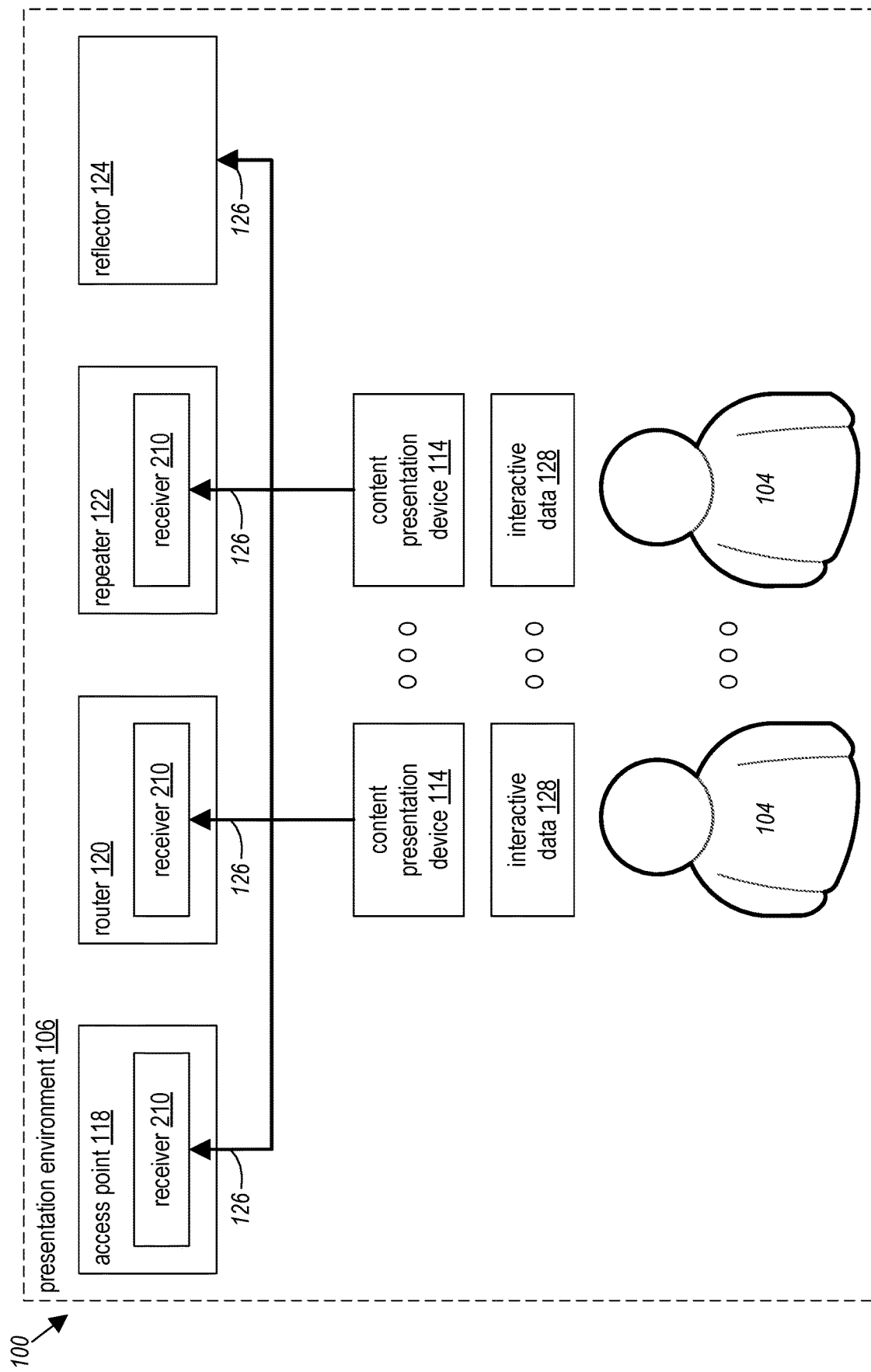
FIG. 1C is a diagram of an embodiment of a content presentation system.
Figure 2D:
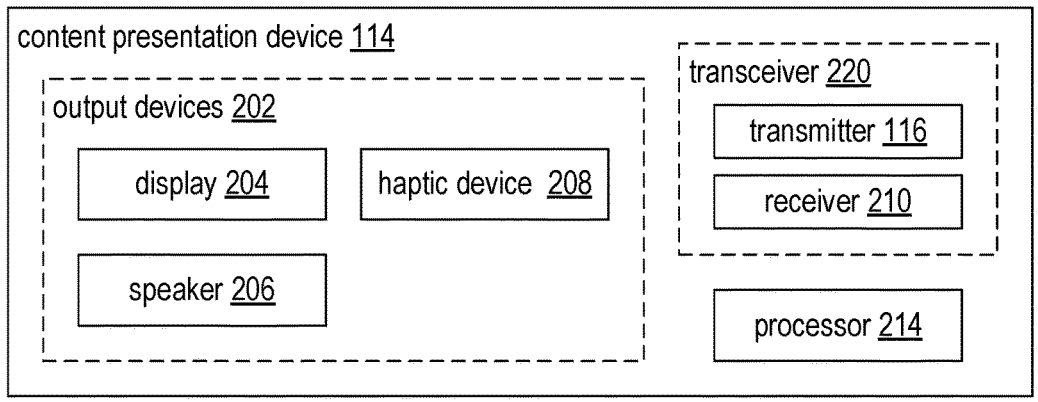
FIG. 2D is a diagram of an embodiment of a content presentation device.
Figure 2E:
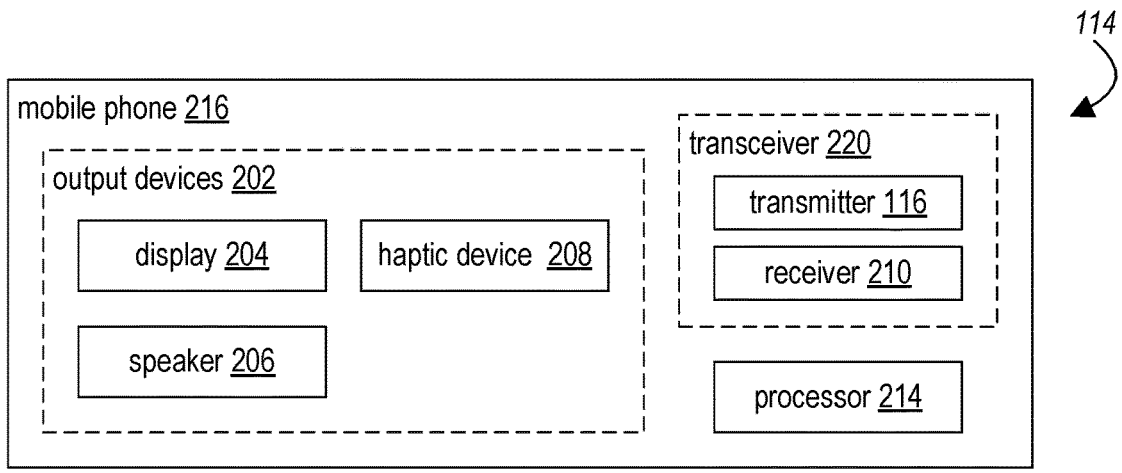
FIG. 2E is a diagram of an embodiment of a content presentation device.
Figure 2F:
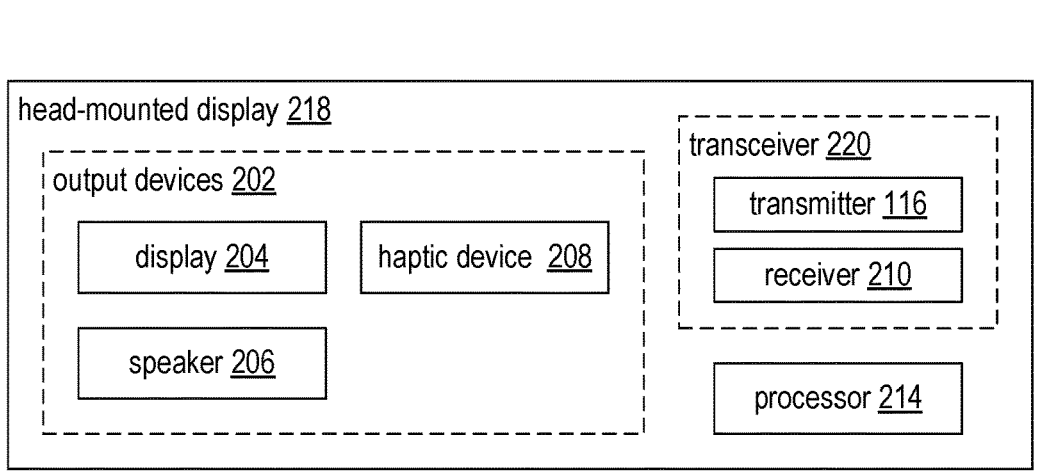
FIG. 2F is a diagram of an embodiment of a content presentation device.

A transmitter 116 may be configured to provide interactive data through a communication link 126. In particular, as shown in FIG. 1C, a receiver 210 (e.g., of the access point 118, the router 120, the repeater 122 or any combination thereof) may receive interactive data 128 provided via the communication link 126, which the virtual reality system 100 may use to generate the content 102. For example, a content presentation device 114 may include a transmitter 116 (as shown in FIGS. 2D, 2E and 2F), and the transmitter of the content presentation device may provide the interactive data 128 via the communication link 126 (as shown in FIG. 1C).

The interactive data 128 may include any of a variety of data, which the virtual reality system 100 may use to generate the content 102 and/or to perform other functions. In some embodiments, the interactive data 128 may indicate 6 degrees of freedom (6DoF) controller input. In some instances, the content presentation device 114 may generate the interactive data 128 indicating the 6DoF controller input, e.g., when the user 104 moves the content presentation device. In some instances, the content presentation device 114 may receive the interactive data 128 indicating the 6DoF controller input from other devices, e.g., from a controller held or worn by the user 104, other controllers, a video camera and/or microphone held or worn by the user, or any other suitable device. In some embodiments, the interactive data 128 may include data indicating hand tracking, data indicating environmental depth mapping, recorded audio, recorded video, or any other suitable interactive data.

One or more components of the virtual reality system 100 may include a transceiver. For example, as shown in FIGS. 2D, 2E and 2F, a content presentation device 114 may include a transceiver 220, which may include a transmitter 116 and a receiver 210. Also, for example, the access point 118, the router 120, and/or the repeater 122 may include a transceiver, which may include a transmitter 116 (as shown in FIG. 1A) and a receiver 210 (as shown in FIG. 1C).

As shown in FIG. 1A, the presentation environment 106 may include a reflector 124 that may be configured to reflect a wireless signal providing a communication link 126 (e.g., from an access point 118 or from a router 120 or from a content presentation device 114). For example, the wireless signal providing a communication link 126 may be travelling in a first direction, and the reflector 124 may reflect the wireless signal in a different second direction.

Figure 1B:
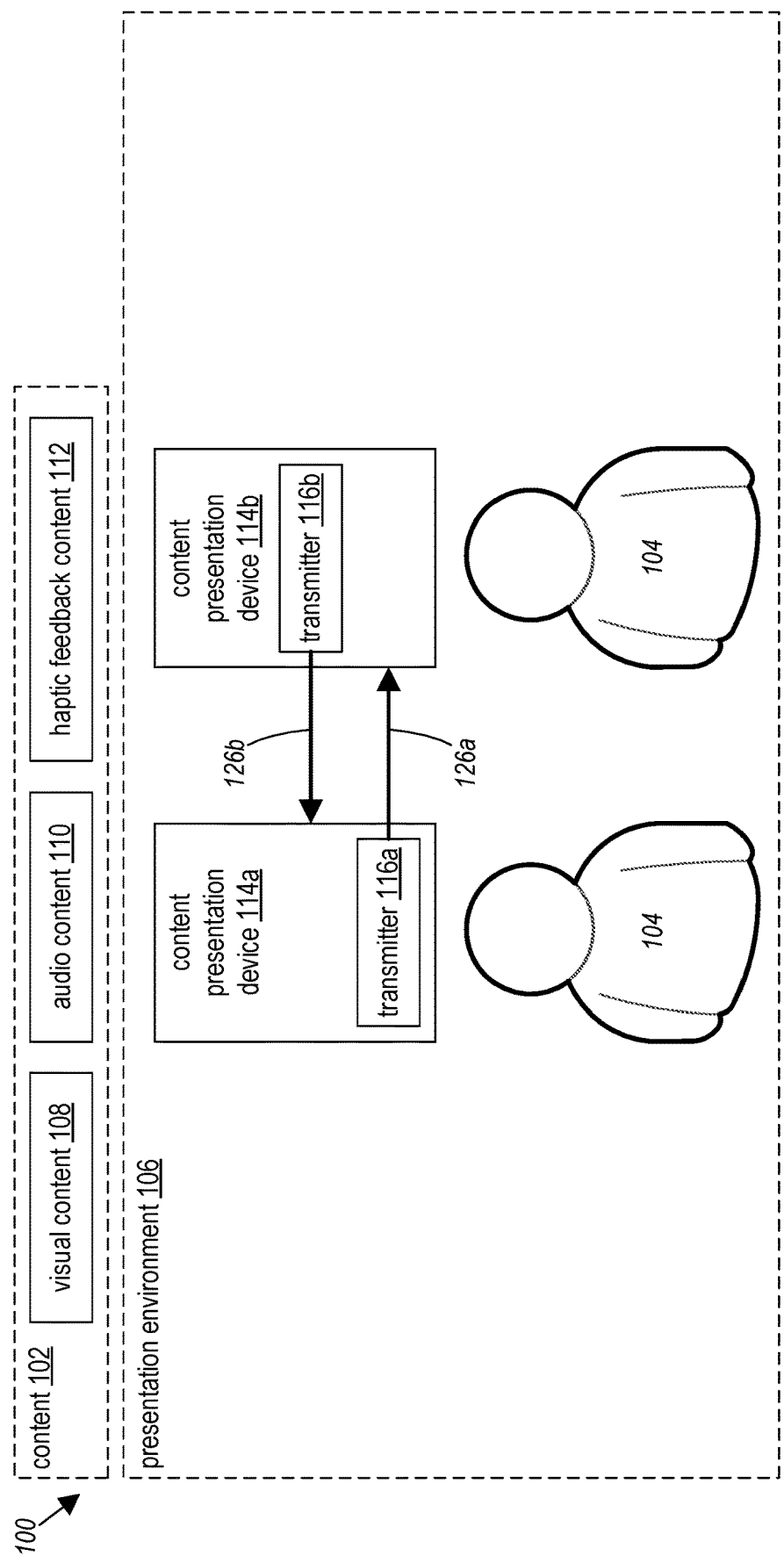
FIG. 1B is a diagram of an embodiment of a content presentation system.

FIG. 1B is a diagram of an embodiment of a content presentation system, such as, the virtual reality system 100. As shown in FIG. 1B, in some embodiments, the virtual reality system 100 may be a peer-to-peer virtual reality system that comprises a plurality of content presentation devices 114. For example, the peer-to-peer virtual reality system may include a first content presentation device 114a and a second content presentation device 114b. The first content presentation device 114a may include a first transmitter 116a, which may provide interactive data 128 and/or at least a portion of the content 102 to the second content presentation device 114b through a first communication link 126a. The second content presentation device 114b may include a second transmitter 116b, which may provide interactive data 128 and/or at least a portion of the content 102 to the first content presentation device 114a through a second communication link 126b. It will be appreciated that the peer-to-peer virtual reality system may include any number of content presentation devices 114 that may include one or more transmitters 116 configured to provide interactive data 128 and/or at least a portion of the content 102 to some or all of the other content presentation devices 114 via one or more communication links 126.

To help provide a user 104 with an immersive virtual reality experience, a content presentation device 114 may present content 102 that may include one or more stimuli. As discussed below, the one or more stimuli in the presented content 102 may cause one or more users 104 to move, which may change the presentation environment 106, and the change in the presentation environment may change a state of one or more communication links 126.

The virtual reality system 100 and the content presentation devices 114 may be configured to allow one or more users 104 to move in the presentation environment 106. For example, the users 104 may move in response to one or more stimuli in the content 102 presented by the content presentation devices 114. The users 104 may, for instance, turn their heads, move their arms, move their legs, or make any other movement; and the users may make such movements while remaining at a location or while moving from a first location to a different second location. In some embodiments, the virtual reality system 100 and the content presentation devices 114 may be configured to provide a 6 degrees of freedom (6DoF) virtual reality experience, that is, in the virtual reality experience, the users 104 may move forward/backward, up/down, left/right (translation in three perpendicular axes) combined with rotation about three perpendicular axes, often termed pitch, yaw, and roll.

In addition to the users 104 themselves, one or more objects in the presentation environment (such as a head-mounted display 218 or other objects) may move, for example, in response to user movement. In one such embodiment, a head-mounted display 218 may move when the user 104 wearing the head-mounted display turns their head, moves their arm, moves their leg, or makes any other movement. In another such embodiment, the user 104 may unintentionally contact an object or may intentionally contact an object (e.g., push, pull, lift or a carry the object), which may cause the object to move. In yet another such embodiment, the object may be a robot that may move in response to user movement (e.g., a user gesture) per an algorithm designed to enhance the virtual reality experience provided by the virtual reality system 100.

This movement of the users 104 and/or the objects changes the presentation environment 106, and such changes in the presentation environment 106 may degrade the performance of the communication link 126. For example, where the change in the presentation environment 106 creates an obstruction of a line of sight between a transmitter 116 and a receiver 210 of a content presentation device 114, the performance of the communication link 126 may degrade, especially where the communication link is a millimeter wave wireless communication link. In some instances, such obstructions to the line of sight may include the users 104 themselves (e.g., a user 104 makes a gesture in which the user's arm obstructs the line of sight to a receiver 210 of the user's content presentation device 114; a first user 104 moves to a location or makes a gesture that obstructs the line of sight to a receiver 210 of a content presentation device 114 of a second user 104). In some instances, such obstructions to the line of sight may include objects in the presentation environment 106 (e.g., a user 104 moves to a location behind an object that obstructs the line of sight to a receiver 210 of the user's content presentation device 114; a user wearing a head-mounted display 218 turns their head causing the head-mounted display itself to block the line of sight to a receiver 210 of the head-mounted display; walls, doors frames or other objects obstruct the line of sight to a receiver 210 of the user's content presentation device 114 as the user moves between rooms in the presentation environment).

This performance degradation may cause the content 102 presented by the content presentation devices 114 to pause and/or skip ahead, disrupting the user's immersion in the virtual reality and potentially ruining the overall user experience. This performance degradation may also prevent the virtual reality system 100 from promptly receiving the interactive data 128, which may cause the virtual reality system to present content 102 that is out of sync with the user's expectations. Such out-of-sync content 102 may also disrupt the user's immersion in the virtual reality and potentially ruin the overall user experience. As discussed below, embodiments disclosed herein may advantageously help avoid or reduce this performance degradation, thus improving content presentation.

Figure 3:
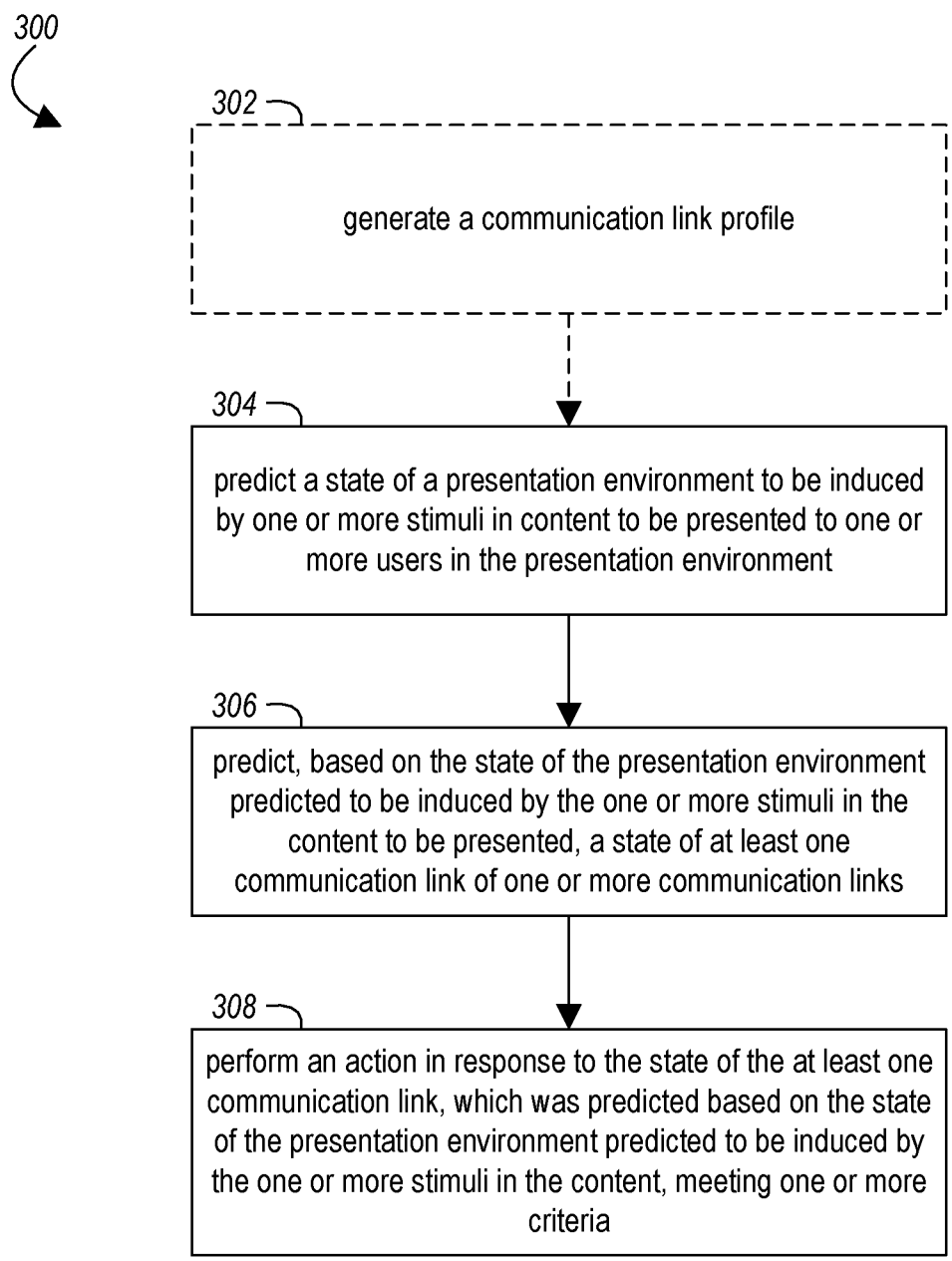
FIG. 3 is a flowchart illustrating an embodiment method for improving content presentation.

FIG. 3 is a flowchart illustrating an embodiment method 300 for improving content presentation, which may be performed by one or more processors. As shown in FIG. 3, the method 300 may include one or more blocks, such as blocks 302, 304, 306, and 308.

At block 304, the processor may predict a state of a presentation environment to be induced by one or more stimuli in content to be presented to one or more users in the presentation environment. For example, the processor may predict a state of the presentation environment 106 to be induced by one or more stimuli in the content 102 to be presented to one or more users 104 in the presentation environment 106. The one or more stimuli in the content to be presented may include one or more audio stimuli in the content, one or more visual stimuli in the content, one or more haptic feedback stimuli in the content, other stimuli, or any combination thereof. The state of the presentation environment, which is predicted at block 304, may comprise a location and/or orientation of one or more users 104 in the presentation environment 106, a location and/or orientation of one or more body parts of the one or more users 104, a location and/or orientation of one or more objects in the presentation environment 106 (e.g., an antenna of a transmitter 116, an antenna 212 of a receiver 210, a user's furniture, obstacles in a virtual reality facility or other objects), a condition of one or more objects in the presentation environment 106 (e.g., a power level and/or other attributes of a transmitter 116), other information reflecting the state of the presentation environment 106, or any combination thereof.

At block 306, the processor may predict a state of at least one communication link of one or more communication links. In some embodiments, the at least one communication link is configured to provide at least a portion of the content 102 after the one or more stimuli are presented. In some embodiments, the at least one communication link is configured to provide interactive data 128 after the one or more stimuli are presented.

In particular, at block 306, the processor may predict, based on the state of the presentation environment predicted (at block 304) to be induced by the one or more stimuli in the content to be presented, a state of at least one communication link of one or more communication links. For example, at block 306, the processor may predict, based on the state of the presentation environment 106 predicted to be induced by the one or more stimuli in the content 102 to be presented, a state of at least one communication link 126 of one or more communication links 126. As discussed above, one or more stimuli may cause one or more users 104 to move, which may change the presentation environment 106, and the change in the presentation environment 106 may change a state of one or more communication links 126. Thus, in some embodiments at block 306, the processor may predict, based on the state of the presentation environment predicted to be induced by the one or more stimuli in the content to be presented, that the at least one communication link would move from a first state having a first level of performance to a second state having a second level of performance. As will be apparent from the discussion below, where the second level of performance is a performance degradation relative to the first level of performance, the processor may perform one or more actions that may advantageously help avoid or reduce this performance degradation, thus improving content presentation.

At block 308, the processor may perform an action in response to the state of the at least one communication link meeting one or more criteria. In particular, at block 308, the processor may perform an action in response to the state of the at least one communication link, which was predicted (at block 306) based on the state of the presentation environment predicted (at block 304) to be induced by the one or more stimuli in the content, meeting one or more criteria. The one or more criteria may comprise a threshold, a metric, one or more other suitable criteria, or any combination thereof. In some embodiments, the state of the at least one communication link meets the one or more criteria when the state of the at least one communication link would cause a failure to receive a subset of the content. In some embodiments, the state of the at least one communication link meets the one or more criteria when the state of the at least one communication link would cause a failure to receive a subset of the interactive data. In some embodiments, the one or more criteria comprises a threshold quality of service of the at least one communication link. In some embodiments, the one or more criteria comprises a latency of the at least one communication link.

The processor may perform the action at block 308 at any desired time. In some embodiments, performing the action at block 308 may occur before the predicted state of the presentation environment occurs, before the predicted state of the at least one communication link occurs, before the at least one communication link has a state that meets the one or more criteria, or any combination thereof. In instances in which performing the action occurs before the predicted state of the presentation environment occurs, before the predicted state of the at least one communication link occurs, before the at least one communication link has a state that meets the one or more criteria, or any combination thereof, the action may advantageously help avoid or reduce a performance degradation of the at least one communication link, thus improving content presentation. Some exemplary actions that may be performed at block 308 and that may help improve content presentation are discussed with reference to FIG. 7A below.

The processor may predict the state of the presentation environment at block 304 and predict the state of the at least one communication link at block 306 at any desired times.

In some embodiments, predicting the state of the presentation environment at block 304 occurs before the one or more stimuli are presented to the one or more users. In some embodiments, predicting the state of the at least one communication link at block 306 occurs before the one or more stimuli are presented to the one or more users. In instances in which predicting the state of the presentation environment at block 304 and/or predicting the state of the at least one communication link at block 306 occur before the one or more stimuli are presented to the one or more users, performing the action at block 308 may occur before the one or more stimuli are presented to the one or more users, before the predicted state of the presentation environment occurs, before the predicted state of the at least one communication link occurs, before the at least one communication link has a state that meets the one or more criteria, or any combination thereof—which may advantageously help avoid or reduce a performance degradation of the at least one communication link, thus improving content presentation, as discussed above.

Figure 4A:
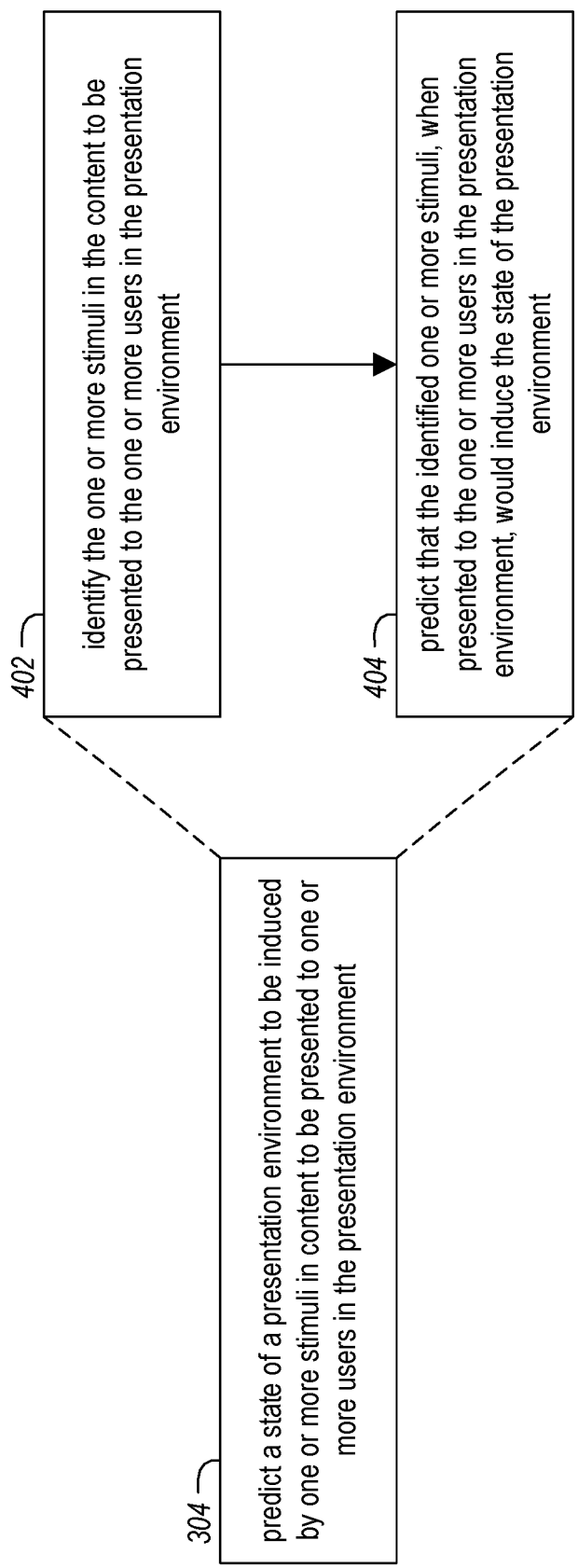
FIG. 4A is a flowchart illustrating an embodiment method for improving content presentation.

FIG. 4A is a flowchart illustrating an embodiment method for improving content presentation, which may be performed by one or more processors. As shown in FIG. 4A, in some embodiments, block 304 (FIG. 3) may include one or more blocks, such as blocks 402 and 404. In particular, to predict (at block 304) the state of the presentation environment to be induced by the one or more stimuli in the content to be presented to the one or more users in the presentation environment, the processor may identify the one or more stimuli in the content to be presented to the one or more users in the presentation environment (at block 402) and predict that the identified one or more stimuli, when presented to the one or more users in the presentation environment, would induce the state of the presentation environment (at block 404).

FIG. 4B is a flowchart illustrating an embodiment method for improving content presentation, which may be performed by one or more processors. As shown in FIG. 4B, in some embodiments, block 304 (FIG. 3) may include one or more blocks, such as block 406. In particular, to predict (at block 304) the state of the presentation environment to be induced by the one or more stimuli in the content to be presented to the one or more users in the presentation environment, the processor may predict that the one or more stimuli, when presented to the one or more users in the presentation environment, would induce movement by the one or more users that would result in the state of the presentation environment (at block 406). For example, it may be predicted that the one or more stimuli, when presented to the one or more users 104 in the presentation environment 106, would induce the one or more users to turn their heads, move their arms, move their legs, or make any other movement, resulting in the state of the presentation environment. Also, for example, it may be predicted that the one or more stimuli, when presented to the one or more users 104 in the presentation environment 106, would induce the one or more users to make a movement that causes one or more objects in the presentation environment to move, resulting in the state of the presentation environment. As discussed above, such objects may include a head-mounted display 218 worn by a user 104, an object unintentionally contacted by a user, an object intentionally contacted by a user, a robot that may move in response to user movement (e.g., a user gesture), or other objects.

FIG. 4C is a flowchart illustrating an embodiment method for improving content presentation, which may be performed by one or more processors. As shown in FIG. 4C, in some embodiments, block 304 (FIG. 3) may include one or more blocks, such as block 408. In particular, to predict (at block 304) the state of the presentation environment to be induced by the one or more stimuli in the content to be presented to the one or more users in the presentation environment, the processor may predict that the one or more stimuli, when presented to the one or more users in the presentation environment, would induce movement by one or more objects in the presentation environment that would result in the state of the presentation environment.

As shown in block 304 in FIG. 3, block 404 in FIG. 4A, block 406 in FIG. 4B, and block 408 in FIG. 4C, one or more predictions related to states of the presentation environment may be made. In some embodiments, as will be apparent from the following discussion, these predictions may be made using historical data indicating how one or more users responded to the content, using heuristics data indicating expected responses to the content independent of any gathered historical data, metadata for the content, data indicating the location and/or orientation of one or more users and/or objects in the presentation environment, other data, or any combination thereof.

Some or all of the predictions made in blocks 304, 404, 406, and 408 may be predicted using historical data indicating how one or more users responded to the content. This historical data may indicate how one or more current users in the presentation environment previously responded to the content, how other users previously responded to the content, or both. In further detail, the historical data may indicate how the one or more users, in response to the content, turned their heads, moved their arms, moved their legs, made any other movement, remained at a location, moved to a location, remained motionless, or responded in any other way to the content. For example, in instances where the content comprises a first-person-shooter game in which an enemy visibly approaches a user from the periphery of the user's field of view (FoV), the historical data may indicate that users tended to turn their head towards the enemy and/or move towards the enemy. Also, for example, in instances where the content includes a sound, the historical data may indicate that users tended to turn their head towards the sound and/or move towards the sound.

Some or all of the predictions made in blocks 304, 404, 406, and 408 may be predicted using heuristics data indicating expected responses to the content, which may be independent of any gathered historical data. In further detail, the data indicating expected responses to the content may indicate how the one or more users, in response to the content, are expected to turn their heads, move their arms, move their legs, make any other movement, remain at a location, move to a location, remain motionless, or respond in any other way to the content. For example, in instances where the content comprises a first-person-shooter game in which an enemy visibly approaches a user from the periphery of the user's field of view, the data indicating expected responses to the content may indicate that users would turn and run towards the enemy or that users would turn and run away from the enemy, depending upon game dynamics and strategy. Also, for example, in instances where the content includes a sound, the data indicating expected responses to the content may indicate that users would turn and run towards the sound or that users would turn and run away from the sound, depending upon game dynamics and strategy.

Some or all of the predictions made in blocks 304, 404, 406, and 408 may be predicted using metadata for the content. The metadata for the content may be provided, for example, by a developer of the content or by some other means. The metadata for the content may include metadata indicating one or more stimuli in the content (e.g., one or more audio stimuli in the content, one or more visual stimuli in the content, one or more haptic feedback stimuli in the content, one or more other stimuli in the content, or any combination thereof). In such embodiments where metadata for the content is provided, the historical data indicating how one or more users responded to the content may comprise data associating the metadata indicating one or more stimuli in the content with how one or more users turned their heads, moved their arms, moved their legs, made any other movement, remained at a location, moved to a location, remained motionless, or responded in any other way to the one or more stimuli. Also, in such embodiments where metadata for the content is provided, the heuristics data indicating expected responses to the content may comprise data associating the metadata indicating one or more stimuli in the content with how one or more users are expected to turn their heads, move their arms, move their legs, make any other movement, remain at a location, move to a location, remain motionless, or respond in any other way to the one or more stimuli.

Some or all of the predictions made in blocks 304, 404, 406, and 408 may be predicted using data indicating the location and/or orientation of one or more users and/or objects in the presentation environment. For example, in such embodiments where the data indicates the location and/or orientation of one or more pieces of furniture and indicates the location of one or more walls, the movements of one or more users may be predicted in view of the walls and furniture, which may be used to predict the state of the presentation environment. For instance, because the walls are typically fixed and some furniture is difficult for users move, predictions of the state of the presentation environment may account for the likelihood that users will move around the furniture and will not move through the walls. The data indicating the location and/or orientation of one or more users and/or objects in the presentation environment may be gathered using simultaneous localization and mapping (SLAM) technology, computer vision, any other suitable means, or any combination thereof.

FIG. 5 is a flowchart illustrating an embodiment method for improving content presentation, which may be performed by one or more processors. As shown in FIG. 5, in some embodiments, block 306 (FIG. 3) may include one or more blocks, such as block 502.

At block 502, the processor may use a communication link profile to identify a communication link state that the communication link profile associates with the state of the presentation environment predicted to be induced, wherein the predicted state of the at least one communication link is the identified communication link state. For example, the processor may use a communication link profile, such as communication link profile 130 in FIG. 1A, to identify a communication link state that the communication link profile associates with the state of the presentation environment that was predicted (at block 304) to be induced; and the state of the at least one communication link predicted at block 306 may be the communication link state identified at block 502.

The communication link profile 130 may comprise data associating one or more communication link states with one or more states of the presentation environment. The communication link profile 130 may include, for example, data directly associating one or more communication link states with one or more states of the presentation environment, data indirectly associating one or more communication link states with one or more states of the presentation environment (e.g., data in an artificial intelligence (AI) system), other data, or any combination thereof.

Figure 6:
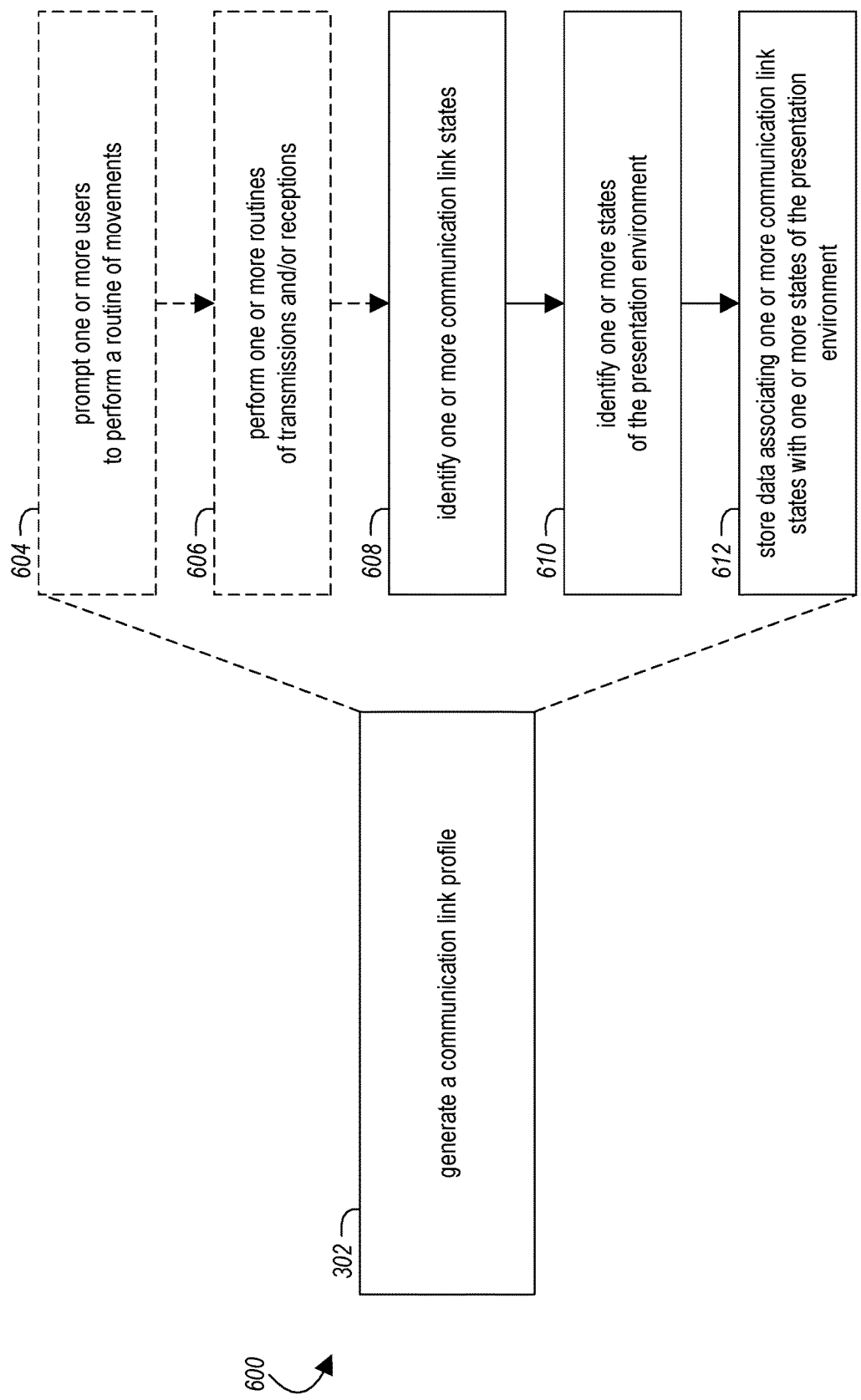
FIG. 6 is a flowchart illustrating an embodiment method 600 for generating a communication link profile.

FIG. 6 is a flowchart illustrating an embodiment method 600 for generating a communication link profile (e.g., the communication link profile 130), which may be performed by one or more processors. As shown in FIG. 6, the method 600 may include one or more blocks, such as block 302; and in some embodiments, block 302 may include one or more blocks, such as blocks 604, 606, 608, 610, and 612.

At block 302, the processor may generate a communication link profile in any of a variety of suitable ways. As shown in FIG. 3, the method 300 may optionally include the block 302.

In some embodiments, to generate the communication link profile at block 302, a user, a receiver, and/or a transmitter may perform one or more routines. For example, as shown in FIG. 6, at block 604, a head-mounted display or other component of the virtual reality system may prompt a user wearing the head-mounted display to perform a routine of movements (e.g., turn head, move arms, move legs, make any other movement, remain at a location, move to a location, remain motionless). In another example, at block 606, a transmitter (e.g., a transmitter 116) may perform a routine of transmissions, for example, while the user performs the routine of movements at block 604. The routine of transmissions may include, for example, a variety of different beam configurations. In yet another example, at block 606, a receiver (e.g., a receiver 210) may perform a routine of receptions, for example, while the user performs the routine of movements at block 604. The routine of receptions may include, for example, a variety of different antenna configurations.

While the user performs the routine of movements at block 604, the transmitter performs the routine of transmissions at block 606, and/or the receiver performs the routine of receptions at block 606, the processor may identify one or more communication link states at block 608 and may identify one or more states of the presentation environment at block 610. The processor may then store data associating one or more communication link states with one or more states of the presentation environment at block 612. For example, at block 612, the processor may store—as at least a portion of the communication link profile—associations between one or more identified states of the communication link used in the transmissions/receptions and one or more identified states of the presentation environment. The identified states of the communication link used in the transmissions/receptions may include, for example, data throughput of the communication link, latency of the communication link, signal strength of the wireless signal providing the communication link, an amount of consistency in the communication link (e.g., the communication link has data throughput, latency and/or other attributes that are even or relatively consistent), an amount of reliability in the communication (e.g., the communication link has a data throughput, latency and/or other attributes that are reliably at a desired level) or other communication link states. The identified states of the presentation environment may include, for example, a location and/or orientation of one or more users in the presentation environment, a location and/or orientation of one or more body parts of the one or more users, a location and/or orientation of one or more objects in the presentation environment, a condition of one or more objects in the presentation environment, other information reflecting the state of the presentation environment, or any combination thereof.

It will be appreciated, however, that blocks 604 and 606 are not required and that users need not be prompted to perform routines and that routines of transmissions and/or receptions need not be performed. For example, in some embodiments, to generate the communication link profile, one or more communication states may be identified at block 608 and one or more states of the presentation environment may be identified at block 610 during one or more users' ordinary use of the virtual reality system 100. Thus, in such embodiments, while the users use the virtual reality system, the processor may (at block 612) store the data associating one or more communication link states with one or more states of the presentation environment.

In some embodiments, to generate the communication link profile, a computer vision scan may be performed to gather data identifying a location and/or orientation of one or more users in the presentation environment, a location and/or orientation of one or more body parts of the one or more users, a location and/or orientation of one or more objects in the presentation environment, or any combination thereof.

Figure 7A:
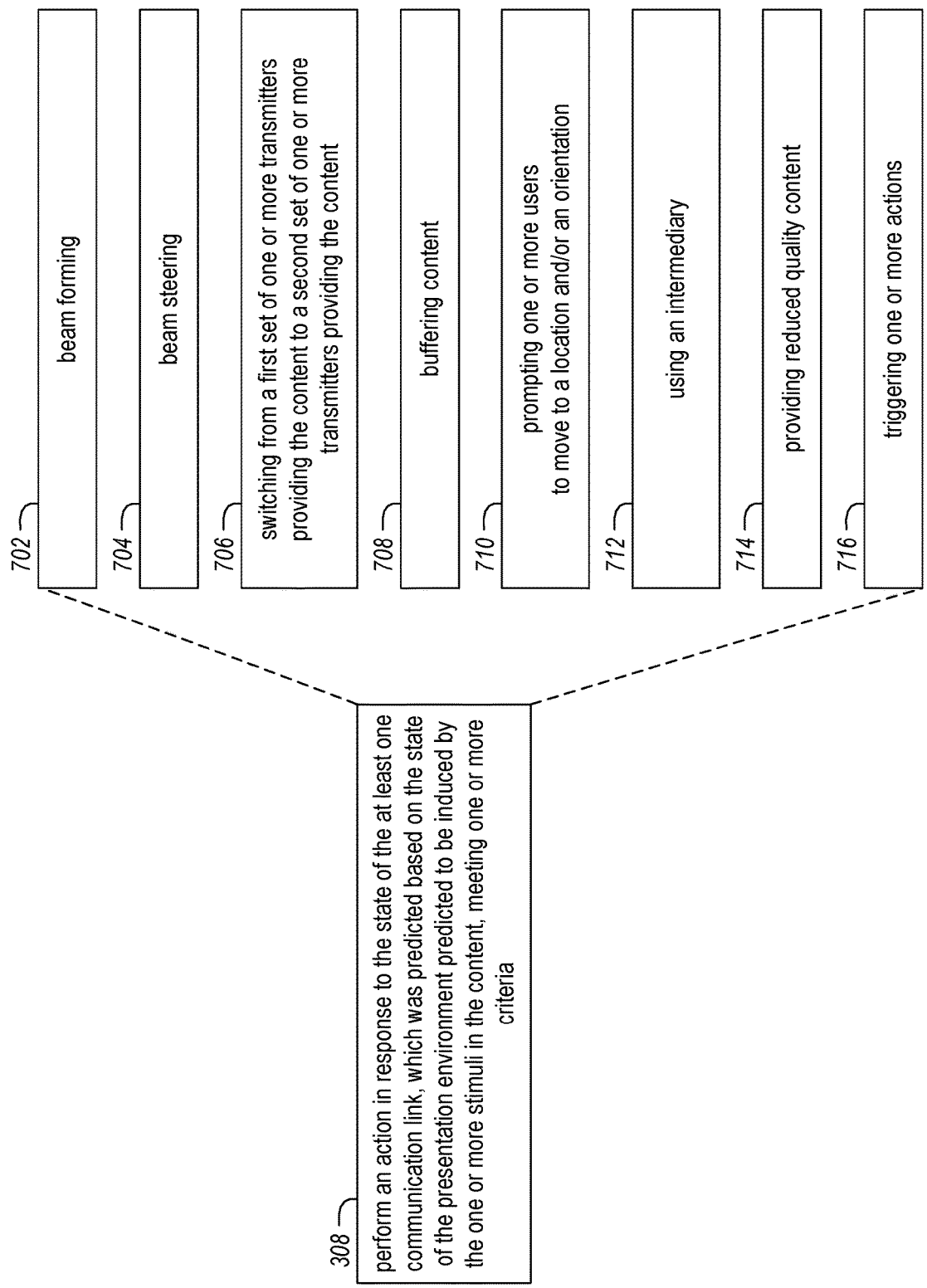
FIG. 7A is a flowchart illustrating an embodiment method for improving content presentation.

FIG. 7A is a flowchart illustrating an embodiment method for improving content presentation, which may be performed by one or more processors. As shown in FIG. 7A, in some embodiments, block 308 (FIG. 3) may include one or more blocks, such as blocks 702, 704, 706, 708, 710, 712, 714, and 716 or any combination thereof.

As shown at block 702, the action performed in response to the state of the at least one communication link meeting one or more criteria at block 308 may comprise beam forming. For example, a processor of a transmitter 116, a processor of a receiver 210, or both may perform beam forming at block 702.

As shown at block 704, the action performed in response to the state of the at least one communication link meeting one or more criteria at block 308 may comprise beam steering. For example, a processor of a transmitter 116, a processor of a receiver 210, or both may perform beam steering at block 704.

The beam forming (block 702) and the beam steering (block 704) may include reconfiguring one or more antennas of one or more receivers 210, reconfiguring one or more antennas of one or more transmitters 116, or both. Reconfiguring one or more antennas of a receiver 210 may include, for example, switching from using one antenna of the receiver to another antenna of the receiver or altering the configuration of one or more currently used antennas of the receiver. Reconfiguring one or more antennas of a transmitter 116 may include, for example, switching from using one antenna of the transmitter to another antenna of the transmitter or altering the configuration of one or more currently used antennas of the transmitter.

The beam forming (block 702) and the beam steering (block 704) may be based on a communication link profile, such as the communication link profile 130. For example, as part of block 702 or block 704, the processor may use the communication link profile 130 to identify a state of the presentation environment 106 that the communication link profile associates with an improved communication link state, and the processor may then change the presentation environment to the identified state of the presentation environment by reconfiguring one or more antennas of the receiver 210 and/or reconfiguring one or more antennas of the transmitter 116. In some instances, where the predicted state of the at least one communication link and/or the predicted state of the presentation environment involves a degradation of performance, the pre-beam forming and/or the beam steering may allow the content presentation device to present the content with fewer (or no) pauses or skips and in sync with the user's expectations, during the duration of that performance degradation.

As shown at block 706, the action performed in response to the state of the at least one communication link meeting one or more criteria at block 308 may comprise switching from a first set of one or more transmitters providing the content to a second set of one or more transmitters providing the content. For example, this switching may include (1) switching from using a first access point to using a second access point that uses the same type of wireless communication link as the first access point or (2) switching from using a first access point to using a second access point that uses a different second type of wireless communication link than the first access point (e.g., from a millimeter wave wireless link to a wireless communication link other than millimeter wave, such as WiFi or Bluetooth).

The switching at block 706 may be based on a communication link profile, such as the communication link profile 130. For example, as part of block 706, the processor may use the communication link profile 130 to identify a state of the presentation environment 106 that the communication link profile associates with an improved communication link state, and the processor may then change the presentation environment to the identified state of the presentation environment by switching from a first set of one or more transmitters 116 providing the content to a second set of one or more transmitters 116 providing the content. In some instances, where the predicted state of the at least one communication link and/or the predicted state of the presentation environment involves a degradation of performance, the switching at block 706 may allow the content presentation device to present the content with fewer (or no) pauses or skips and in sync with the user's expectations, during the duration of that performance degradation.

As shown at block 708, the action performed in response to the state of the at least one communication link meeting one or more criteria at block 308 may comprise buffering content. For example, in some embodiments, a processor 214 of a content presentation device 114 may pre-fetch (and buffer) additional content sufficient to present content during a predicted duration in which the predicted state of the at least one communication link meets the one or more criteria. As another example, a processor 214 of a content presentation device 114 may pre-fetch (and buffer) additional content sufficient to present content during a predicted duration in which the predicted state of the presentation environment occurs. In some instances, where the predicted state of the at least one communication link and/or the predicted state of the presentation environment involves a degradation of performance, the pre-fetching and buffering may allow the content presentation device to present the content with fewer (or no) pauses or skips, during the duration of that performance degradation.

As shown at block 710, the action performed in response to the state of the at least one communication link meeting one or more criteria at block 308 may comprise prompting one or more users to move to a location and/or an orientation. For example, in some embodiments, a head-mounted display 218 or other component of the virtual reality system 100 may prompt a user to move to a selected location and/or an orientation. Where two or more users are using the virtual reality system 100 (e.g., in a peer-to-peer virtual reality system), some or all of the users may be prompted to move to one or more selected locations and/or orientations at block 710.

The location and/or orientation at block 710 may be selected using the communication link profile 130. The communication link profile 130 may be used to select a location and/or orientation predicted to avoid one or more states of the at least one communication link and/or the presentation environment that would result in a degradation of performance.

The users may be prompted at block 710 at any suitable time. For example, in some embodiments, a user may be prompted to move to a selected location and/or orientation to begin experiencing the content (e.g., a starting point). As another example, a user may be prompted to move to a selected location and/or orientation to while the user is experiencing the content (e.g., while the user is wearing a head-mounted display and is immersed in virtual reality). In some instances, the content 102 itself may be dynamically selected to cause to the user to move to the selected location and/or orientation. If desired, the dynamically selected content may be configured to be seamlessly integrated into the content such that the user is not aware of the prompt, thus preserving the user's immersion in virtual reality. Alternatively, the dynamically selected content may be configured to be distinct from the virtual reality (e.g., arrows or other directional indicators), which may be more effective in prompting the user's movement but may reduce the user's immersion in virtual reality.

As shown at block 712, the action performed in response to the state of the at least one communication link meeting one or more criteria at block 308 may comprise using an intermediary. For example, in a peer-to-peer virtual reality system that includes a first content presentation device and a second first content presentation device, an access point, router, repeater, or a third content presentation device in the peer-to-peer virtual reality system may be used as an intermediary between the first and second content presentation devices at block 712. In some instances, where the predicted state of the at least one communication link and/or the predicted state of the presentation environment involves a degradation of performance, the use of the intermediary may allow one or more content presentations devices to present the content with fewer (or no) pauses or skips and in sync with the user's expectations, during the duration of that performance degradation.

As shown at block 714, the action performed in response to the state of the at least one communication link meeting one or more criteria at block 308 may comprise providing reduced quality content. In some embodiments, a transmitter 116 or other component of the virtual reality system 100 may provide reduced quality content. The reduced quality content may include content at a lower resolution, content at a lower frame rate, content with reduced colors, content with reduced or no background imagery, or other content with reduced quality.

In such embodiments, the transmitter 116 or other component of the virtual reality system 100 may configure the reduced quality content to include higher priority content and omit lower priority content. Including higher priority content and omitting lower priority content may be useful, for instance, where block 706 involves switching to a reliable but slower communication link type (e.g., from a millimeter wave wireless link to a wireless communication link other than millimeter wave, such as WiFi or Bluetooth). The prioritization of the content and decision to include or omit portions of the content may be performed using one or more algorithms based on defined rules and/or dynamically at runtime. For example, in an automobile driving virtual reality, an experienced user may not require the background image detail to enjoy the experience or perform well, and thus, the algorithm may deprioritize and/or omit the background imagery from the content. Also, for example, in a battlefield portion of a virtual reality, a user may require the content to be in full resolution; however, when walking through a path that has minimal activity, the frame rate or resolution could be reduced by the algorithm. In some instances, where the predicted state of the at least one communication link and/or the predicted state of the presentation environment involves a degradation of performance, providing reduced quality content may allow the content presentation device to present a satisfactory version of the content with fewer (or no) pauses or skips, during the duration of that performance degradation.

As shown at block 716, the action performed in response to the state of the at least one communication link meeting one or more criteria at block 308 may comprise triggering one or more actions, for example, any of the actions at blocks 702, 704, 706, 708, 710, 712, 714, and 716 or any combination thereof. In particular, any component of the virtual reality system 100 may perform some or all the method 300 and, as part of that performance, may (at block 716) trigger itself and/or any other component of the virtual reality system 100 to perform any of the actions at blocks 702, 704, 706, 708, 710, 712, 714, and 716 or any combination thereof.

Figure 7B:
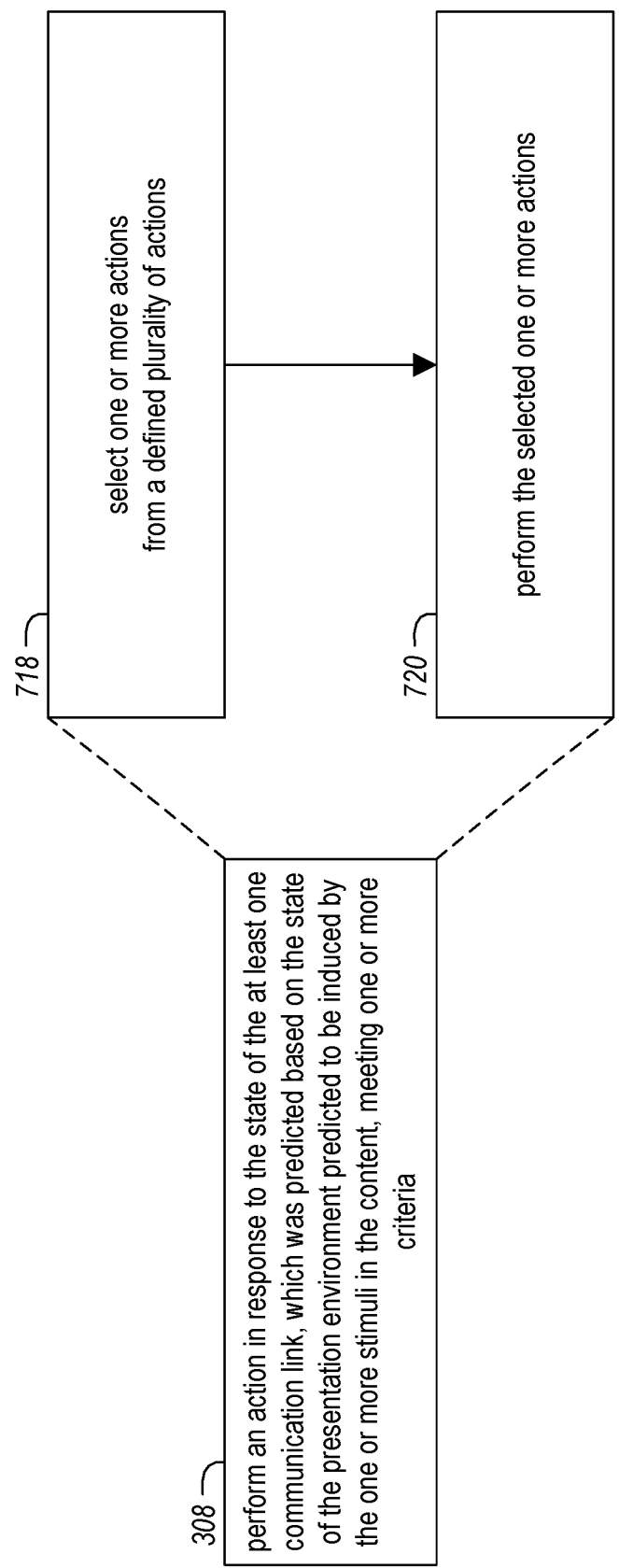
FIG. 7B is a flowchart illustrating an embodiment method for improving content presentation.

FIG. 7B is a flowchart illustrating an embodiment method for improving content presentation, which may be performed by one or more processors. As shown in FIG. 7B, in some embodiments, block 308 (FIG. 3) may include one or more blocks, such as blocks 718. In particular, to perform (at block 308) an action in response to the state of the at least one communication link meeting one or more criteria, the processor may select one or more actions from a defined plurality of actions at block 718 and may perform the selected one or more actions at block 720. In some embodiments, the defined plurality of actions may comprise any of the actions at blocks 702, 704, 706, 708, 710, 712, 714, and 716; one or more other actions; or any combination thereof.

In some embodiments, the selection at block 718 may involve selecting what is the best action to take based on the predicted state of the at least one communication link and/or the predicted state of the presentation environment. In some embodiments, the selection at block 718 may be based on a probability that the predicted state of the at least one communication link and/or the predicted state of the presentation environment will or will not remain for a defined duration. For instance, certain actions may be more desirable if a user is likely to quickly return to a previous location and/or orientation, while other actions may be more desirable if a user is likely to remain at a predicted location and/or orientation for the defined duration. In some embodiments, the selection at block 718 may be based on at least one of one or more properties of the content to be presented to one or more users in the presentation environment, one or more properties of the state of the presentation environment predicted to be induced by the one or more stimuli in the content to be presented, one or more properties of the predicted state of at least one communication link, other factors, or any combination thereof.

In addition to performing the methods above, the virtual reality system 100 could also be configured to download as much relevant content 102 as possible while a strong and stable communication link 126 is available. A user 104 may be moving around quite a bit during a virtual reality session and frequently coming in and out of access to the communication link 126. In this case, the virtual reality system 100 could provide as much content 102 as possible during the periods in which the communication link 126 is available, subject (of course) to the ability of a content presentation device's ability to store the content.

The functionality of the embodiments disclosed herein—including but not limited to the functionality described with reference to the methods illustrated in FIGS. 3, 4A, 4B, 4C, 5, 6, 7A and 7B—may be performed by a "processing system" that includes one or more processors (e.g., a processor 214, a processor of a receiver 210, a processor of transmitter 116, a processor of an access point 118, a processor of a router 120, a processor of a repeater 122, a processor one or more other components of the virtual reality system 100, or any combination thereof). Examples of such processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software to perform the functionality of the embodiments disclosed herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The methods and systems described above require no particular component or function. Thus, any described component or function—despite its advantages—is optional. Also, some or all of the described components and functions described above may be used in connection with any number of other suitable components and functions.

One skilled in the art will also appreciate that although the exemplary embodiments discussed above have been described with respect to a virtual reality system, these aspects and features may also be used in connection with other types of systems that may present content.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A method for improving content presentation, the method comprising:

by a processor:

predicting a state of a presentation environment to be induced by one or more stimuli in content to be presented to one or more users in the presentation environment including predicting that the one or more stimuli, when presented to the one or more users in the presentation environment, would induce movement by the one or more users that would result in the state of the presentation environment;

predicting, based on the state of the presentation environment predicted to be induced by the one or more stimuli in the content to be presented, a state of at least one communication link of one or more communication links, wherein the predicted state of the at least one communication link includes a performance degradation of the communication link; and performing an action in response to the state of the at least one communication link, which was predicted based on the state of the presentation environment predicted to be induced by the one or more stimuli in the content, meeting one or more criteria.

2. The method of claim 1, wherein predicting a state of a presentation environment to be induced by one or more stimuli in content to be presented to one or more users in the presentation environment comprises:

identifying the one or more stimuli in the content to be presented to the one or more users in the presentation environment; and predicting that the identified one or more stimuli, when presented to the one or more users in the presentation environment, would induce the state of the presentation environment.

3. The method of claim 1, wherein the action comprises one or more of: beam forming, beam steering, switching from a first set of one or more transmitters providing the content to a second set of one or more transmitters providing the content, buffering content, prompting one or more users to move to a location, prompting one or more users to move to an orientation, using an intermediary, providing reduced quality content, triggering beam forming, triggering beam steering, triggering a switching from a first set of one or more transmitters providing the content to a second set of one or more transmitters providing the content, triggering a buffering of content, triggering a prompting of one or more users to move to a location, triggering a prompting of one or more users to move to an orientation, triggering a use of an intermediary, or triggering a providing of reduced quality content.

4. The method of claim 1, wherein performing an action in response to the state of the at least one communication link meeting one or more criteria comprises:

selecting one or more actions from a defined plurality of actions; and performing the selected one or more actions.

5. The method of claim 4, wherein selecting one or more actions from a defined plurality of actions is based on at least one of: one or more properties of the content to be presented to the one or more users in the presentation environment, one or more properties of the state of the presentation environment predicted to be induced by the one or more stimuli in the content to be presented, or one or more properties of the predicted state of at least one communication link.

6. The method of claim 4, wherein the defined plurality of actions comprises two or more of: beam forming, beam steering, switching from a first set of one or more transmitters providing the content to a second set of one or more transmitters providing the content, buffering content, prompting one or more users to move to a location, prompting one or more users to move to an orientation, using an intermediary, providing reduced quality content, triggering beam forming, triggering beam steering, triggering a switching from a first set of one or more transmitters providing the content to a second set of one or more transmitters providing the content, triggering a buffering of content, triggering a prompting of one or more users to move to a location, triggering a prompting of one or more users to move to an orientation, triggering a use of an intermediary, or triggering a providing of reduced quality content.

7. The method of claim 1, wherein the presentation environment comprises the one or more users, one or more content presentation devices, one or more transmitters for providing the content, and one or more objects in the presentation environment.

8. The method of claim 1, wherein the one or more criteria comprises a threshold quality of service of the at least one communication link.

9. The method of claim 1, wherein the at least one communication link is configured to provide interactive data after the one or more stimuli are presented.

10. The method of claim 1, wherein predicting a state of a presentation environment to be induced by one or more stimuli in content to be presented to one or more users in the presentation environment comprises:

predicting that the one or more stimuli, when presented to the one or more users in the presentation environment, would induce movement by one or more objects in the presentation environment that would result in the state of the presentation environment.

11. The method of claim 1, wherein performing the action occurs before at least one of: the one or more stimuli are presented to the one or more users, the predicted state of the presentation environment occurs, the predicted state of the at least one communication link occurs, or the at least one communication link has a state that meets the one or more criteria.

12. The method of claim 1, wherein predicting, based on the state of the presentation environment predicted to be induced by the one or more stimuli in the content to be presented, a state of at least one communication link of one or more communication links comprises:

using a communication link profile to identify a communication link state that the communication link profile associates with the state of the presentation environment predicted to be induced, wherein the predicted state of the at least one communication link is the identified communication link state.

13. The method of claim 12, further comprising:

by the processor:

generating the communication link profile.

14. The method of claim 1, wherein an access point includes the processor, or a content presentation device includes the processor.

15. The method of claim 1, wherein the at least one communication link is configured to provide at least a portion of the content after the one or more stimuli are presented.

16. A non-transitory processor-readable storage medium having stored thereon processor-executable instructions configured to cause a processor of a server to perform operations, comprising:

predicting a state of a presentation environment to be induced by one or more stimuli in content to be presented to one or more users in the presentation environment including predicting that the one or more stimuli, when presented to the one or more users in the presentation environment, would induce movement by the one or more users that would result in the state of the presentation environment;

predicting, based on the state of the presentation environment predicted to be induced by the one or more stimuli in the content to be presented, a state of at least one communication link of one or more communication links, wherein the predicted state of the at least one communication link includes a performance degradation of the communication link; and performing an action in response to the state of the at least one communication link, which was predicted based on the state of the presentation environment predicted to be induced by the one or more stimuli in the content, meeting one or more criteria.

17. A system for improving content presentation, the system comprising:
a processor configured with processor-executable instructions to perform operations comprising:
predicting a state of a presentation environment to be induced by one or more stimuli in content to be presented to one or more users in the presentation environment including predicting that the one or more stimuli, when presented to the one or more users in the presentation environment, would induce movement by the one or more users that would result in the state of the presentation environment;
predicting, based on the state of the presentation environment predicted to be induced by the one or more stimuli in the content to be presented, a state of at least one communication link of one or more communication links, wherein the predicted state of the at least one communication link includes a performance degradation of the communication link; and
performing an action in response to the state of the at least one communication link, which was predicted based on the state of the presentation environment predicted to be induced by the one or more stimuli in the content, meeting one or more criteria.

18. The system of claim 17, wherein predicting a state of a presentation environment to be induced by one or more stimuli in content to be presented to one or more users in the presentation environment comprises:
identifying the one or more stimuli in the content to be presented to the one or more users in the presentation environment; and
predicting that the identified one or more stimuli, when presented to the one or more users in the presentation environment, would induce the state of the presentation environment.

19. The system of claim 17, wherein the action comprises one or more of: beam forming, beam steering, switching from a first set of one or more transmitters providing the content to a second set of one or more transmitters providing the content, buffering content, prompting one or more users to move to a location, prompting one or more users to move to an orientation, using an intermediary, providing reduced quality content, triggering beam forming, triggering beam steering, triggering a switching from a first set of one or more transmitters providing the content to a second set of one or more transmitters providing the content, triggering a buffering of content, triggering a prompting of one or more users to move to a location, triggering a prompting of one or more users to move to an orientation, triggering a use of an intermediary, or triggering a providing of reduced quality content.

20. The system of claim 17, performing an action in response to the state of the at least one communication link meeting one or more criteria comprises:
selecting one or more actions from a defined plurality of actions; and
performing the selected one or more actions.

21. The system of claim 20, wherein selecting one or more actions from a defined plurality of actions is based on at least one of: one or more properties of the content to be presented to the one or more users in the presentation environment, one or more properties of the state of the presentation environment predicted to be induced by the one or more stimuli in the content to be presented, or one or more properties of the predicted state of at least one communication link.

22. The system of claim 20, wherein the defined plurality of actions comprises two or more of: beam forming, beam steering, switching from a first set of one or more transmitters providing the content to a second set of one or more transmitters providing the content, buffering content, prompting one or more users to move to a location, prompting one or more users to move to an orientation, using an intermediary, providing reduced quality content, triggering beam forming, triggering beam steering, triggering a switching from a first set of one or more transmitters providing the content to a second set of one or more transmitters providing the content, triggering a buffering of content, triggering a prompting of one or more users to move to a location, triggering a prompting of one or more users to move to an orientation, triggering a use of an intermediary, or triggering a providing of reduced quality content.

23. The system of claim 17, wherein the presentation environment comprises the one or more users, one or more content presentation devices, one or more transmitters for providing the content, and one or more objects in the presentation environment.

24. The system of claim 17, wherein the one or more criteria comprises a threshold quality of service of the at least one communication link.

25. The system of claim 17, wherein the at least one communication link is configured to provide interactive data after the one or more stimuli are presented.

26. The system of claim 17, wherein predicting a state of a presentation environment to be induced by one or more stimuli in content to be presented to one or more users in the presentation environment comprises:
predicting that the one or more stimuli, when presented to the one or more users in the presentation environment, would induce movement by one or more objects in the presentation environment that would result in the state of the presentation environment.

27. The system of claim 17, wherein performing the action occurs before at least one of: the one or more stimuli are presented to the one or more users, the predicted state of the presentation environment occurs, the predicted state of the at least one communication link occurs, or the at least one communication link has a state that meets the one or more criteria.

28. The system of claim 17, wherein predicting, based on the state of the presentation environment predicted to be induced by the one or more stimuli in the content to be presented, a state of at least one communication link of one or more communication links comprises:
using a communication link profile to identify a communication link state that the communication link profile associates with the state of the presentation environment predicted to be induced, wherein the predicted state of the at least one communication link is the identified communication link state.

29. The system of claim 28, wherein the operations further comprise generating the communication link profile.

30. The system of claim 17, further comprising:
an access point that includes the processor, or
a content presentation device that includes the processor.

31. The system of claim 17, wherein the at least one communication link is configured to provide at least a portion of the content after the one or more stimuli are presented.

\* \* \* \* \*